United States Patent [19]
Meistrick et al.

[11] Patent Number: 5,809,964
[45] Date of Patent: Sep. 22, 1998

[54] METHOD AND APPARATUS TO ACCOMPLISH EXHAUST AIR RECIRCULATION DURING ENGINE BRAKING AND/OR EXHAUST GAS RECIRCULATION DURING POSITIVE POWER OPERATION OF AN INTERNAL COMBUSTION ENGINE

[75] Inventors: Zdenek Meistrick, Bloomfield; Vincent Pitzi, So. Windsor, both of Conn.

[73] Assignee: Diesel Engine Retarders, Inc., Wilmington, Del.

[21] Appl. No.: 814,015

[22] Filed: Mar. 10, 1997

Related U.S. Application Data

[63] Continuation-in-part of Ser. No. 794,635, Feb. 3, 1997.
[51] Int. Cl.$^6$ .................................................... F02D 13/04
[52] U.S. Cl. ........................................ 123/321; 123/323
[58] Field of Search ................................ 123/321, 323, 123/320, 90.12, 90.13, 90.16, 90.45, 90.46, 198 F, 324, 90.15

[56] References Cited

U.S. PATENT DOCUMENTS

| | | | |
|---|---|---|---|
| 4,836,162 | 6/1989 | Melde-Tuczai et al. | 123/321 |
| 4,932,372 | 6/1990 | Meneely | 123/182 |
| 5,647,318 | 7/1997 | Feucht et al. | 123/322 |
| 5,680,841 | 10/1997 | Hu | 123/322 |

Primary Examiner—Raymond A. Nelli
Attorney, Agent, or Firm—Collier, Shannon, Rill & Scott, PLLC

[57] ABSTRACT

A method and apparatus for carrying out variable timing exhaust gas recirculation is disclosed for use during both positive power and retarding operation of an internal combustion engine. Motion or energy is derived from an engine component and stored as potential energy. The stored energy is selectively applied to a valve actuator to carry out exhaust gas recirculation in an engine cylinder. The energy derived from the engine may be stored and selectively applied to the valve actuator with an electronically controlled trigger valve. The valve actuator may be a slave piston having an inner core and an outer sleeve capable of opening the valve of the cylinder in response to independent exhaust gas recirculation and compression release hydraulic systems.

86 Claims, 24 Drawing Sheets

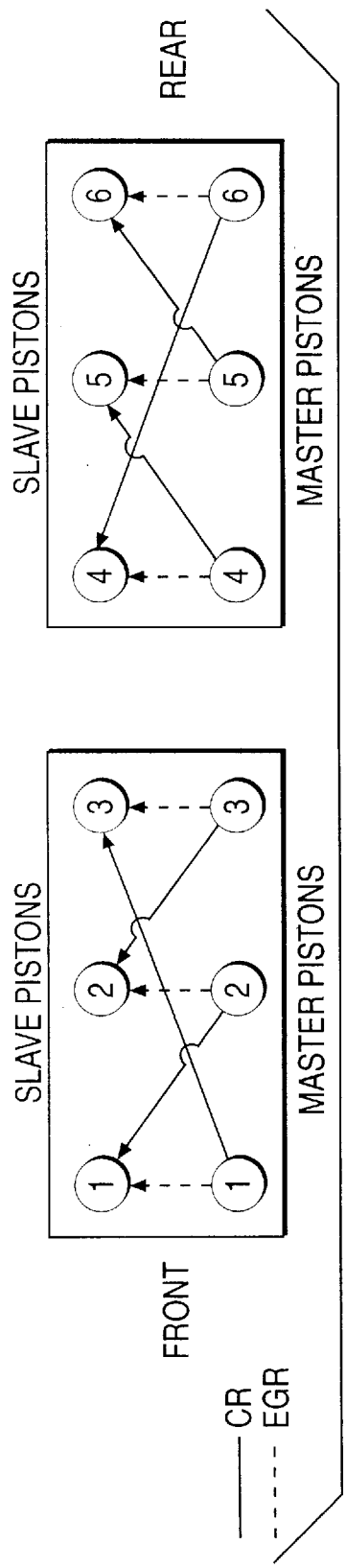
FIG. 19
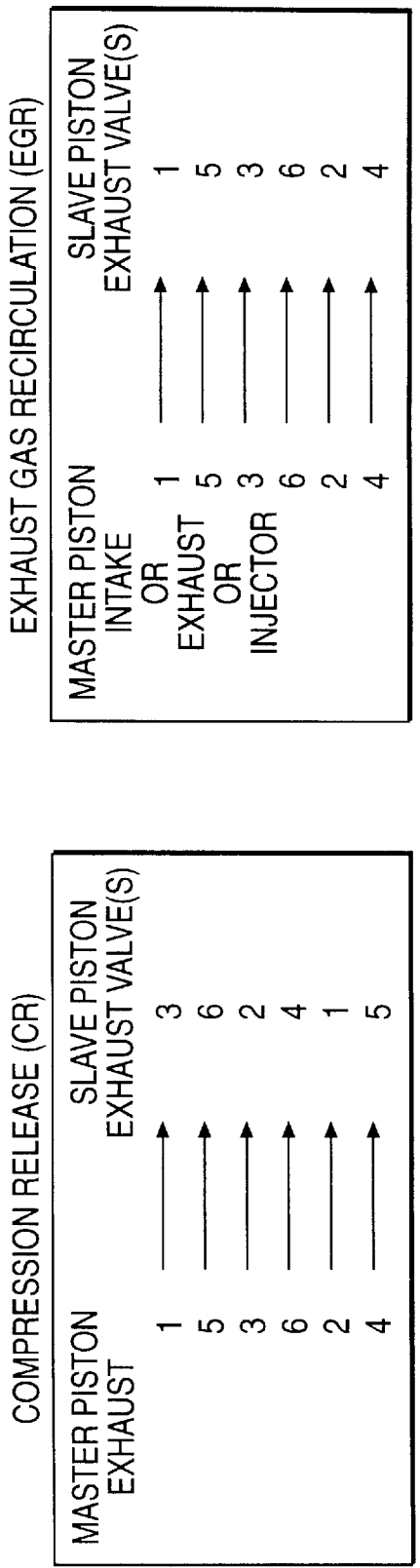
FIG. 21
FIG. 20

METHOD AND APPARATUS TO ACCOMPLISH EXHAUST AIR RECIRCULATION DURING ENGINE BRAKING AND/OR EXHAUST GAS RECIRCULATION DURING POSITIVE POWER OPERATION OF AN INTERNAL COMBUSTION ENGINE

This application is a continuation-in-part application of copending U.S. patent application Ser. No. 08/794,635 filed on Feb. 3, 1997 entitled "Method and Apparatus to Accomplish Exhaust Air Recirculation During Engine Braking and/or Exhaust Gas Recirculation During Positive Power Operation of an Internal Combustion Engine." The specification of which is herein incorporated by reference.

FIELD OF THE INVENTION

The present invention relates generally to the field of engine control and actuation-systems for engine braking systems and on positive power, for internal combustion engines. Specifically, the invention relates to a method and apparatus for the use of exhaust air recirculation during engine braking and/or exhaust gas recirculation during positive power operation of an internal combustion engine. The invention recirculates a portion of the engine exhaust to enhance compression release braking of the engine and/or to control emissions on positive power.

BACKGROUND OF THE INVENTION

Compression release-type engine retarders are well-known in the art. Engine retarders are designed to convert temporarily an internal combustion engine of either the spark ignition or compression ignition type into an air compressor. A compression release retarder decreases the kinetic energy of an engine by opposing the upward motion of the engine's pistons on the compression stroke. As a piston travels upward on its compression upstroke, the gases that are trapped in the cylinder are compressed. The compressed gases oppose the upward motion of the piston. When the piston nears the top of its stroke, an exhaust valve is opened to "release" the compressed gases. The pressure having been released from the cylinder, the piston cannot recapture the energy stored in the compressed gases on the subsequent expansion downstroke.

In so doing, the engine develops retarding power to help slow down the vehicle. This provides the operator with increased control over the vehicle. A properly designed and adjusted compression release-type engine retarder can develop retarding power that is a substantial portion of the power developed by the engine on positive power. Compression release-type retarders of this type supplement the braking capacity of the primary vehicle wheel braking system. In so doing, these retarders may substantially extend the life of the primary wheel braking system of the vehicle. The basic design of a compression release type engine retarding system is disclosed in Cummins, U.S. Pat. No. 3,220,392. The compression release-type engine retarder disclosed in the Cummins patent employs a hydraulic system to control the operation of the exhaust valves to effect the compression release event. The hydraulic control system engages the engine's existing valve actuation system, namely, the rocker arms of the engine.

When the engine is operating under positive power, the hydraulic control system of the compression release retarder is disengaged from the valve control system, so that no compression release event occurs. When compression release retarding is desired, the engine is deprived of fuel and the hydraulic control system of the compression release brake engages the valve control system of the engine. The valve control system drives the compression release retarder to produce compression release events at the appropriate times.

The hydraulic systems of compression release engine retarders typically have a number of components. A solenoid valve is typically actuated to supply engine oil to fill the hydraulic circuits of the compression release engine retarder, when retarding is desired. A master piston engages the valve control system of the engine, typically at a rocker arm. The master piston, in turn, is hydraulically connected to a slave piston. The slave piston is connected to an exhaust valve of the engine. When the compression release retarder is actuated, the rocker arm pushes against the master piston. The motion of the master piston forces the slave piston to actuate, which in turn opens the exhaust valve of the internal combustion engine at a point near the end of the compression stroke.

Much of the energy stored by compressing the gas in the cylinder is not recovered during the subsequent expansion or power stroke of the engine. Instead, it is dissipated through the exhaust and radiator systems of the engine. By dissipating the energy developed by compressing the cylinder charge, the compression release-type retarder slows the vehicle down.

Typically, it is desired to open the compression release-type engine retarder as late in the engine cycle as possible. In this way, the engine develops greater compression, allowing more energy to be dissipated through the compression release retarder. Delaying the opening of the exhaust valve in the compression release event, however, may substantially increase the loading on critical engine components.

The force required to open the exhaust valve during the compression release event is transmitted back through the hydraulic system through the push tubes and the camshaft. This can impose substantial force on certain engine components. If the timing is delayed long enough, the pressure in the cylinder can become high enough to exceed the ability of the compression release retarder to properly open the exhaust valve.

Historically, engine manufacturers desired to minimize modification of the engine. Consequently, compression release-type retarders originally were installed as after-market items. It was, therefore, necessary to design the compression release retarder to accept the existing rocker arm motion of the engine, without modification. A rocker arm that moves close to the desired time of the compression release event was typically selected as the initiating motion to effect the compression release event. A remote exhaust or intake rocker arm of another cylinder, that was undergoing either exhaust or intake at about the time of the desired compression release event, was frequently selected. In other cases, a fuel injector cam associated with a cylinder that was undergoing its compression event was selected. These design choices often required compromising performance to some degree.

Compression release retarders have enjoyed substantial and continuing commercial success in the marketplace. Engine manufacturers have been more willing to make engine design modifications to accommodate the compression release-type engine retarder, as well as to improve its performance and efficiency. Engine manufacturers are also increasingly willing to make other modifications to engine components that would enhance compression release retarding.

In the meantime, manufacturers continued to explore a variety of new ways to improve the efficiency of their engines. Environmental, safety, and efficiency demands have pushed the technology of compression release engine retarding significantly over the past 30 years. These changes have resulted in a number of engine modifications. As engines have become smaller and more fuel efficient, the demands on retarder performance have often increased, requiring the compression release-type engine retarder to generate greater amounts of retarding power under more stringent or limiting conditions.

Another method of engine retarding is exhaust braking, in which a restriction is imposed in the exhaust system. This increases the back pressure in the exhaust system, making it harder for the piston to force gases out of the cylinder on the exhaust stroke.

The compression release-type retarder operates on the compression stroke of the engine, the exhaust-type retarder operates on the exhaust stroke. The exhaust restriction can be supplied by any of a number of means, all of which are well known in the art, for example, a butterfly or guillotine valve. With the exhaust restriction in place, the pressure of gases in the exhaust manifold rises. This, in turn, impairs the flow of gases out of the cylinder on the exhaust stroke. As the piston moves upward on the exhaust stroke, evacuating the cylinder, it is now pushing against a higher pressure in the manifold than when the gas restrictor was absent. This pressure pushes against the cylinder helping to slow the vehicle. In addition, the higher pressure in the exhaust manifold also means that not as much of the gases will be allowed to exit the cylinder on the exhaust stroke. This will leave a higher residual charge on the subsequent intake stroke than when an exhaust restriction was not being used. This higher residual cylinder charge will undergo compression. If a compression release-type retarder is also used in combination with the exhaust brake, the higher exhaust pressure can enhance the performance of the compression release-type retarder on the subsequent compression stroke.

Many engines also use a turbocharger to increase the amount of air forced into a cylinder on intake and improve performance. The use of an exhaust restrictor, however, inhibits turbocharger performance, dramatically reducing the amount of boost air delivered to the intake side of the engine. This effect dramatically impairs compression release-type engine brake performance.

As the market for compression release-type engine retarders has developed and matured, these multiple factors have pushed the direction of technological development toward a number of goals: securing higher retarding power from the compression release retarder; working with, in some cases, lower volumes and masses of air that are deliverable to the cylinders through the intake system; and the interrelationship (and sometimes interference) of various collateral or ancillary equipment, including: intake and/or exhaust silencer; turbocharger; and/or exhaust brake.

Engine manufacturers have also become increasingly willing to make design modifications to their engines that would increase the performance and reliability, and broaden the operating parameters, of compression release-type engine retarders. Various techniques to improve the efficiency of the engine on positive power have also been incorporated into engines. For example, a portion of the exhaust gases can be recirculated through the engine to attempt to achieve more complete burning of the exhaust gases, thereby reducing certain types of emissions. Various methods to increase the amount of exhaust gas delivered to the cylinder on intake have also been explored.

Exhaust gas recirculation systems are well known prior to the present invention. In most of these systems, however, a portion of the exhaust gas flow is diverted from a point downstream of the exhaust manifold to a point on the intake side of the engine. Although these technologies aid in controlling emissions, they require axillary hardware, such as piping and control systems. This in turn adds to the cost and complexity of the engine.

Ueno, Japanese Laid Open Patent No. Sho 63-25330 (February 1988), assigned to Isuzu, for Exhaust Brake Apparatus for Internal Combustion Engine, discloses a method of increasing the amount of gases delivered to the cylinder on intake. Ueno incorporates an additional lobe or bump on the cam that actuates an exhaust valve. Ueno incorporates an exhaust brake, which increases the pressure of exhaust gases in the exhaust manifold. The additional cam lobe forces the exhaust valve of the cylinder that will undergo the compression release retarding event to open near the end of its intake stroke. At this point, the pressure of gases in the cylinder on intake is low, relative to the pressure in the exhaust manifold. This opening causes additional gases to enter the low pressure cylinder on intake from the higher pressure exhaust manifold, increasing the amount of gases available to the compression release retarder on the succeeding compression stroke.

Neitz, et al., U.S. Pat. No. 4,981,119 (Jan. 1, 1991), for Method of Increasing the Exhaust Braking Power of an Internal Combustion Engine, discloses a method in which an exhaust valve is opened briefly at the end of the intake stroke to increase the air charge to the cylinder. This increases the retarding power realized from a compression release event. The Neitz method is also carried out in combination with exhaust braking.

Gobert, et al., U.S. Pat. No. 5,146,890 (Sep. 15, 1992), for Method and a Device for Engine Braking of a Four-Stroke Internal Combustion Engine, discloses yet another method for controlling the actuation of the exhaust valve at the end of the intake and beginning of the compression stroke. To increase the amount of gases trapped in the cylinder on compression, communication is established between the combustion chamber and the exhaust system when the piston is located in the proximity of its bottom-dead-center position after the inlet stroke.

None of these methods, however, provide solutions to certain problems of compression release-type retarding. They each suffer, at least three fundamental limitations. First, all of these prior methods require modification of the engine cam profile. Modification of the cam profile, however, is not feasible. It would be desirable, therefore, to have a system for accomplishing exhaust air recirculation on compression release retarding and exhaust gas recirculation on positive power that does not require modification of the cam profile. In particular, it would be desirable to have such a system that does not require any modification of the valve train kinematics.

Prior systems, however, use an extra lobe. This requires running the compression release retarder with extra lash built into the retarder setting. Although numerous systems exist for absorbing this extra lash, they are complex hydraulic systems that typically require additional parts for either the compression released retarder or the engine. It is, therefore, desirable to maintain the existing cam profile of the engine as manufactured, without the use of any extra lobes, extra lash, or additional parts to either the compression release-type retarder or the engine. The present inventors believe that doing so will enhance the reliability of the compression release retarder and the exhaust gas recirculation system.

Second, none of these prior systems disclose, teach, or suggest how to optimize the actuation of the exhaust valve during the intake and compression strokes to achieve the highest possible retarding power from the compression release event, without exceeding the mechanical limits of the engine. Prior systems typically involve unusual dynamic or kinematic loads.

Third, compression release retarders are typically optimized and set for a rated power. The engine, however, is not always operated at its rated speed and is frequently operated at lower speeds. The advertised retarding performance based on the rated speed cannot typically be achieved when operating at lower speeds.

It is, therefore, desirable to provide a method for controlling the braking systems and better tuning them to the speed at which the engine is operating. This is not possible with prior methods, including those discussed above. There remains a significant need for a method for controlling the actuation of the exhaust valve to increase the effectiveness of and to optimize the compression release retarding event. There is a significant need for a system that is able to perform that function over a wide range of engine operating parameters and conditions. In particular, there remains a need to "tune" the compression release-type retarder system to optimize its performance at lower operating speeds than the rated speed of the device.

Relatively large forces must be applied to open the exhaust valves on compression. All of the known systems for supplying the necessary power to open exhaust valves for exhaust air (and/or gas) recirculation and/or compression release braking derive the necessary power from components of the engine that are actuated on a fixed engine timing. Currently, solenoid switches are not capable of producing the necessary forces. Even if this were possible, it is likely that these switches would be unacceptably large and too expensive to be viable for use in a compression release retarder. As discussed above, known hydraulic systems are not able to open the valves to optimize the compression release retarding over a range of engine speeds.

Because the motion used to initiate a compression release event was derived from a contemporaneously moving engine component, hydraulic systems have typically looked to a point on the engine physically remote from the exhaust valve to be opened to derive motion to actuate a compression release event. For example, it may be that the only rocker arm moving at the correct time to open the exhaust valve is on another bank of the engine, or at the other end of the engine block. The length of the hydraulic circuit (with its associated hydraulic compliance) could preclude use of that motion. If, instead, another component is chosen, located closer to the exhaust valve of interest, it may be moving at a time that is not practicable for either compression release or exhaust gas recirculation valve actuation.

Although the Assignee of the present application is also the owner of a number of prior patents for systems that can modify the derived motion, none of these systems provide sufficient control over a range of engine speed to overcome these problems: Meistrick, U.S. Pat. No. 4,706,625 (Nov. 17, 1987) for Engine Retarder With Reset Auto-Lash Mechanism; Hu, U.S. Pat. No. 5,161,501 (Nov. 10, 1992) for Self-Clipping Slave Piston; Custer, U.S. Pat. No. 5,186,141 (Feb. 16, 1993) for Engine Brake Timing Control Mechanism; Hu, U.S. Pat. No. 5,201,290 (Apr. 13, 1993) for Compression Relief Engine Retarder Clip Valve; Meistrick, U.S. Pat. No. 4,949,751 for Compression Release Retarder with Valve Motion Modifier; and Joko, U.S. Pat. Nos. 5,406,918 and 5,485,819 for Internal Combustion Engine, all of which are incorporated herein by reference. While valve lash adjustment systems for advancing the time of valve opening are known prior to the present invention, such systems are limited to: (i) making the valve open earlier, close later, and increasing lift; or (ii) making the valve open later, close earlier, and decreasing lift. These lash adjustment systems do not enable independent control of the time at which a valve is opened and/or closed, or of the lift of the valve. Applicants believe these factors are beneficial to obtain optimal valve opening for exhaust air and/or gas recirculation and compression release braking.

Furthermore, the prior art lash adjustment systems may also not be easily adjusted (or adjustable at all) while the engine is operating. This ease of adjustment is desirable, to change the timing of valve opening, closing, and lift during engine operation to optimize engine breaking over a range of engine speeds.

The present invention, on the other hand, provides a number of benefits that are not available with known prior devices in systems. First, the present invention achieves increased trapped charge to the cylinder at about bottom dead center of the intake stroke. This charge is retained during the subsequent compression stroke resulting in enhanced compression released retarding. Second, the passage for exhaust air or gas is substantially shorter in the present invention than in systems that recirculate the exhaust gas through the intake portion of the engine. Recirculation in the present invention is accomplished from the exhaust manifold directly into the cylinder, rather than through a separate recirculation circuit. Others have done this, as noted above. Moreover, exhaust gas recirculation has not commonly been employed in diesel engines prior to the present invention. The present inventors believe that the invention overcomes a number of the obstacles or problems that were unresolved by the prior methods and systems.

OBJECTS OF THE INVENTION

It is therefore an object of the present invention to provide a method and apparatus to recirculate exhaust gas during compression release braking.

It is another object of the present invention to provide a method and apparatus to recirculate exhaust gas during positive power.

It is an additional object of the present invention to provide a method and apparatus to accomplish exhaust gas recirculation during both compression release retarding and/or positive power operation of an internal combustion engine.

It is yet another object of the present invention to provide a method and apparatus to optimize the magnitude of the exhaust gas recirculation event for compression release braking operation.

It is another object of the present invention to provide a method and apparatus to recirculate exhaust gases on compression release retarding and/or positive power operation of an engine without requiring modification of the cam profile.

It is a further object of the present invention to provide a method and apparatus to increase cylinder charge to improve retarding power.

It is an additional object of the present invention to provide a method and apparatus to control emissions by recirculating exhaust gas to the engine cylinders.

It is another object of the present invention to provide a method and apparatus to selectively control the timing of valve opening, valve closing, and valve lift, during exhaust gas recirculation.

It is yet another object of the present invention to provide a method and apparatus to selectively, and independently, control the timing of valve opening, valve closing, and/or valve lift, during exhaust gas recirculation.

It is yet another object of the present invention to provide a method and apparatus to achieve improved retarding performance.

It is yet another object of the present invention to provide a method and apparatus to control exhaust gas temperature within engine design limits.

It is yet another object of the present invention to provide a method and apparatus to optimize the operation of the compression release retarder at operating speeds other than the rated speed of the engine.

It is yet another object of the present invention to provide a method and apparatus to optimize the operation of the compression release retarder at speeds other than the speed at which the compression release retarder is set at installation.

It is yet another object of the present invention to provide a method and apparatus to optimize the operation of the compression release retarder without manually resetting the compression release retarder.

It is yet another object of the present invention to provide a method and apparatus to achieve variable valve timing.

It is yet another object of the present invention to provide a method and apparatus to optimize the timing of the exhaust gas recirculation event for positive power operation.

It is yet another object of the present invention to provide a method and apparatus to optimize the timing of the exhaust gas recirculation event for positive power operation to improve fuel economy and emission control.

It is yet another object of the present invention to provide a method and apparatus to optimize the magnitude of the exhaust gas recirculation event for positive power operation.

It is yet another object of the present invention to provide a method and apparatus to optimize the timing of the exhaust air recirculation event for compression release braking operation.

It is yet another object of the present invention to provide a method and apparatus to synchronize exhaust gas recirculation with exhaust manifold pressure.

It is yet another object of the present invention to provide a method and apparatus to synchronize exhaust gas recirculation with exhaust manifold pressure, as a function of exhaust manifold temperature.

It is yet another object of the present invention to provide a method and apparatus to synchronize exhaust gas recirculation with exhaust manifold pressure, as a function of engine rpm.

It is still yet a further object of the present invention to provide a slave piston for activating an exhaust valve with force derived from an exhaust gas recirculation circuit and/or a compression release retarder actuation system.

SUMMARY OF THE INVENTION

Applicants have developed an innovative and economical method and apparatus for carrying out exhaust gas recirculation during compression and/or positive power release braking operation of an internal combustion engine, having a valve associated with a cylinder of the engine, a system for providing exhaust gas recirculation to the cylinder independent of the motion of an engine component from which the energy for exhaust gas recirculation is derived, comprising means for deriving motion from the engine component; storage means, in communication with said means for deriving motion, for storing said derived motion as potential energy; energy transfer means, providing communication between said storage means and a valve actuation means, for selectively releasing said stored energy to said valve actuation means; and valve actuation means for opening the valve in response to said energy released from said storage means to provide exhaust gas recirculation to the cylinder.

In an internal combustion engine, the invention is a system for opening a valve of the engine to provide exhaust gas recirculation on both engine retarding and/or positive power, comprising a master piston means, responsive to motion of an engine component; energy storage means, responsive to the motion of master piston means, for storing energy derived from the motion of said master piston; trigger valve means, communicating with said energy storage means, for selectively releasing said stored energy to a slave piston means independent of the motion of the engine component; and slave piston means, communicating with said valve actuation means, for opening the valve in response to said stored energy released by said trigger valve.

The invention is, in an internal combustion engine, a system for utilizing energy derived from the engine to selectively open a cylinder valve, comprising means for deriving energy from the engine having an energy input from said engine and having an energy output; an energy storage means for storing energy received from the means for deriving energy, said storage means having an energy input connected to the energy output of said means for deriving energy and having an energy output; means for controlling the application of the energy stored in the storage means to a valve actuation means, said means for controlling having an energy input connected to the energy output of the storage means and having an energy output; and means for opening a cylinder valve using energy received through the means for controlling, said means for opening having an energy input connected to the means for controlling and having a connection with said valve, wherein the valve may be opened using energy derived from the engine and transferred through the system to the means for opening.

The invention is, in a method of operating an internal combustion engine in a positive power mode and a braking mode, the improvement comprising providing exhaust gas recirculation through the steps of deriving energy from an engine component; temporarily storing said energy; and selectively applying said energy to a means for opening an engine valve to carry out exhaust gas recirculation. The invention provides improved fuel economy and emission control during positive power operation.

The invention is, in an internal combustion engine having a selectively actuated exhaust valve capable of providing exhaust gas recirculation and compression release braking in an engine cylinder, an exhaust valve actuator comprising a fluid tight chamber having a top wall and a side wall; a bifurcated piston having upper and lower portions slidably disposed within said chamber along said side wall, wherein said upper and lower portions have mutually engageable shoulders for applying pressure to one another; a first port in the chamber top wall for providing fluid in a first space between the chamber top wall and the piston upper portion; a second port in the chamber side wall for providing fluid in a second space between the piston upper portion and the piston lower portion; an extension member for transferring force between said piston lower portion and said exhaust valve located externally of said chamber; and spring means for biasing said piston in a direction compatible with said exhaust valve being closed; wherein the provision of fluid in said first space moves the piston upper portion, lower portion, extension member downward and thereby opens said exhaust valve, and wherein the provision of fluid in said second space moves the piston lower portion and extension member downward and thereby opens said exhaust valve.

It is to be understood that both the foregoing general description and the following detailed description are exemplary and explanatory only, and are not restrictive of the invention, as claimed. The accompanying drawings, which are incorporated herein by reference, and which constitute apart of this specification, illustrate certain embodiments of the invention, and together with the detailed description serve to explain the principles of the present invention.

BRIEF DESCRIPTION OF THE DRAWINGS

The invention will be described in conjunction with the following drawings in which like reference numerals designate like elements and wherein:

FIG. 19 is an operating schematic diagram, and FIGS. 20 and 21 are operating tables, of a preferred embodiment of the present invention for a typical, in-line, six (6) cylinder, four cycle engine having a 1-5-3-6-2-4 firing order;

DETAILED DESCRIPTION OF PREFERRED EMBODIMENTS

Figure 1:
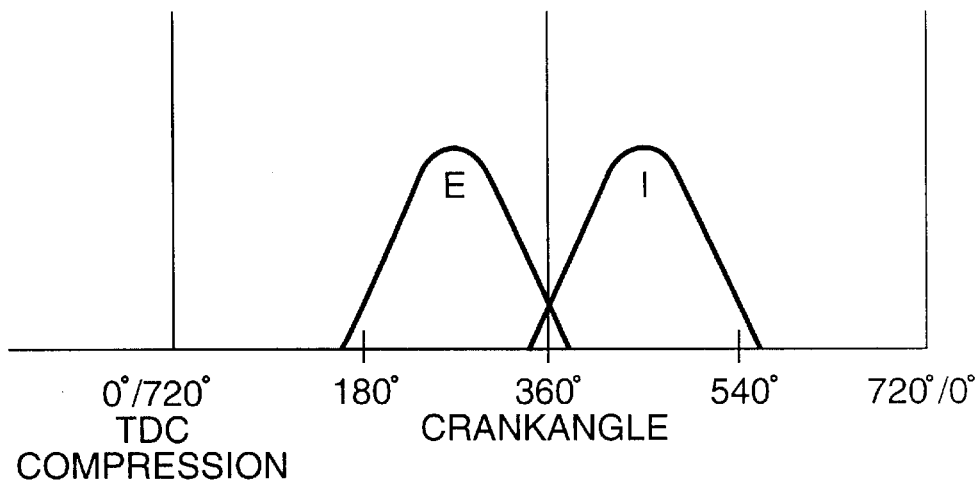
FIG. 1 is a graph depicting valve motion of the exhaust (E) and intake (I) valves, during positive power operation, without exhaust gas recirculation.

For purpose of illustration, the invention will be described for use in a six (6) cylinder in line engine. Reference will now be made to a preferred embodiment of the present invention, an example of which is shown in the FIG. 9 as system 10. System 10 may be used in an internal combustion diesel engine 20 having one or more cylinders 40, and at least one exhaust valve 30 per cylinder. The exhaust valve(s) 30 are actuated by a cam or exhaust rocker arm 50. As embodied herein, system 10 includes exhaust gas recirculation means 200 and compression release retarding means 100.

As a preliminary matter, the present inventors distinguish between exhaust air recirculation and exhaust gas recirculation. Exhaust gas recirculation is commonly used in the field to refer to any method of delivering exhaust gases back to the cylinder. The present inventors, however, distinguish between the term "exhaust air recirculation" and the term "exhaust gas recirculation": Exhaust air recirculation referring specifically to transferring the exhaust gases back to a cylinder before the gases have exited the manifold, typically on compression release braking; and, Exhaust gas recirculation being a more general term referring to any method of recirculating exhaust gases but typically on positive power. Because the term "exhaust gas recirculation" is generally used in the industry, the term will be used in the specification for purposes of convenience.

In a preferred embodiment, the system 10 of the present invention includes two substantially independent subsystems to actuate a valve 30 of a cylinder 40: compression release retarding means 100; and an exhaust gas recirculation means 200. These two subsystems communicate and cooperate with a slave piston 300, to actuate valve 30. The compression release retarding means 100 and the exhaust gas recirculation means 200 comprise separate operating circuits to communicate and cooperate with the slave piston 300 to actuate valve 30. The subsystems 100 and 200 may operate the same valve. However, the use of the subsystems 100 and 200 to operate separate valves 30 is contemplated and considered to be within the scope of the present invention. In this fashion, the present invention can supply the energy or motion necessary to effect exhaust gas recirculation during compression release retarding, and exhaust gas recirculation on positive power. This configuration and construction allows the two subsystems to operate separately and independently of each other, as well as independently of the motion of engine components from which the energy or motion for the exhaust gas recirculation and compression release events is derived. This permits achieving exhaust gas recirculation on positive power, as well as exhaust gas recirculation during compression release braking operation. This also permits the selective timing of exhaust gas recirculation and compression release in accordance with engine parameters, such as rpm and temperature.

During exhaust gas recirculation, flow reverses from the exhaust manifold into the cylinder 40. Control of this air flow substantially affects the resulting mass charge that is delivered to the cylinder 40 on intake and/or early compression. It is this mass charge, when made available to the compression release retarder during the subsequent compression stroke of the engine, that determines significantly, the retarding power available from the compression release engine retarder.

By controlling the timing and magnitude of the opening of the exhaust valve during the exhaust gas recirculation event, a number of benefits of the present invention can be achieved. First, the amount of charge trapped in the cylinder and available for the compression release event can be increased, or at least controlled. Second, the temperature and other operating parameters of the engine can be maintained within design limits. Third, the amount of exhaust gases that are recirculated can be controlled by modifying the timing, and the magnitude, of the opening of the exhaust valve that is being actuated to accomplish exhaust gas recirculation to obtain optimal mixing of gas and recirculated gas.

Figure 2:
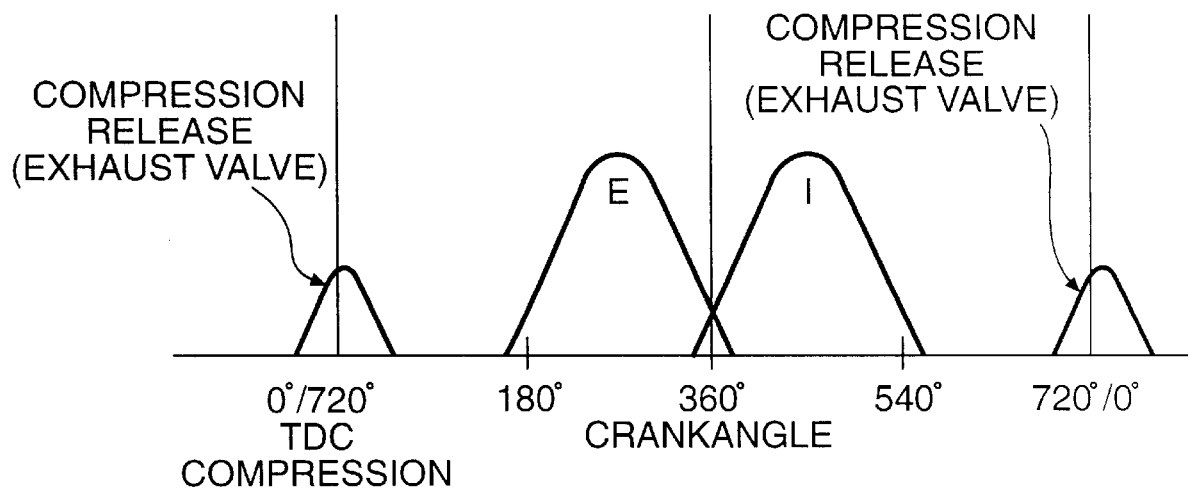
FIG. 2 is a graph depicting valve motion of the exhaust (E) and intake (I) valves, during compression release retarder operation, without exhaust air recirculation.
Figure 3:
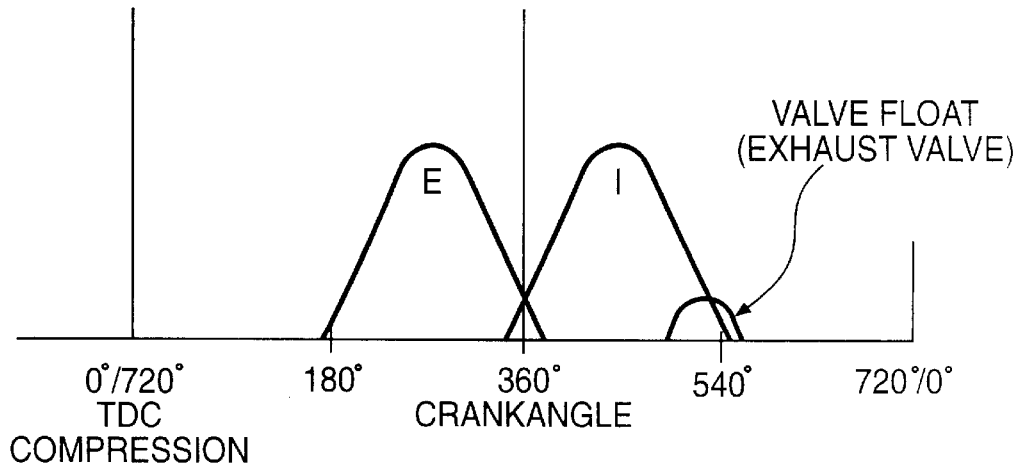
FIG. 3 is a graph depicting valve motion of the exhaust (E) and intake (I) valves, during exhaust retarder operation, depicting a valve float event.
Figure 4:
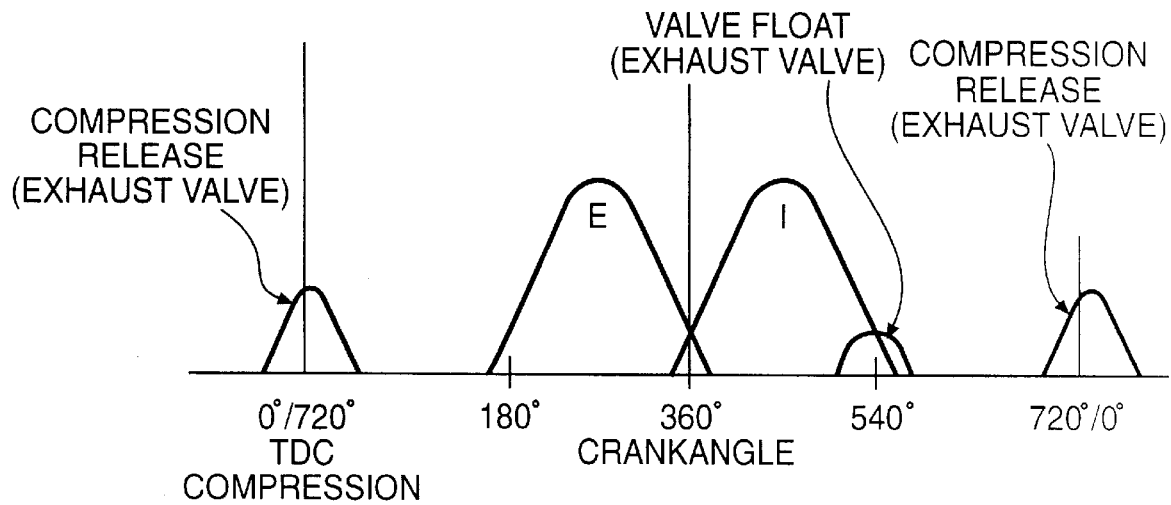
FIG. 4 is a graph depicting valve motion of the exhaust (E) and intake (I) valves, during combination compression release retarder and exhaust retarder operation, depicting a valve float event.

Reference will now be made to FIGS. 1–8 which are illustrations of valve motion under various operating conditions of the engine. FIG. 1 depicts the motion of the intake ("I") and exhaust ("E") valves of the engine through one complete engine cycle (i.e., two full rotations of the crank shaft). The exhaust valve lifts are shown in each of FIGS. 1–8, the exhaust valve lift under the influence of the engine valve train is denoted by the letter E. Similarly, the intake valve lift under the influence of the engine valve train is denoted by the letter I. The lifts of the exhaust valve actuated by valve float, compression release retarder, exhaust gas recirculation are shown in the accompanying figures. FIG. 2 depicts the motion of the exhaust and intake valves with the use of a compression release retarder without exhaust gas recirculation of the present invention. FIG. 3 and FIG. 4 depict the exhaust valve motion when an exhaust retarder is used, either alone (FIG. 3) or in combination with a compression release retarder (FIG. 4).

Figure 5:
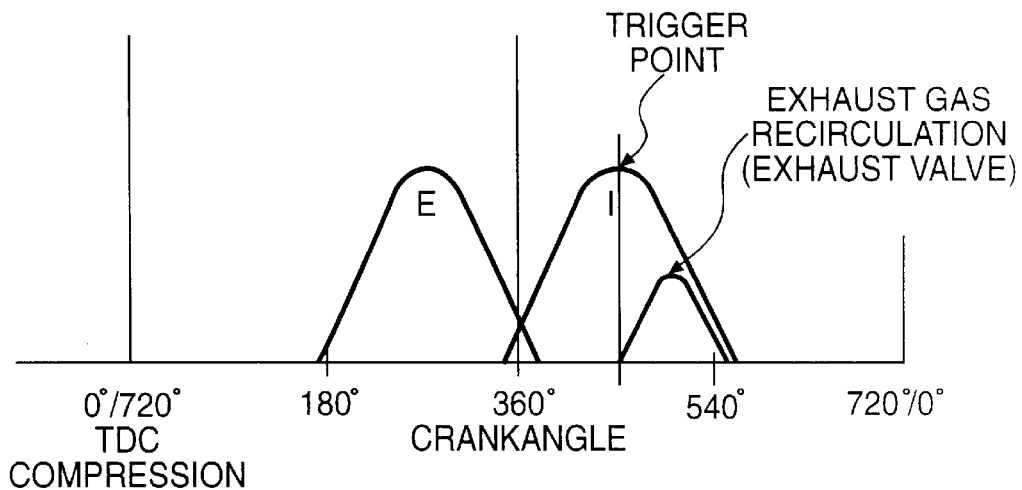
FIG. 5 is a graph depicting valve motion of the exhaust (E) and intake (I) valves, of the present invention, during positive power operation, with exhaust gas recirculation, using the intake master piston to provide exhaust gas recirculation.
Figure 6:
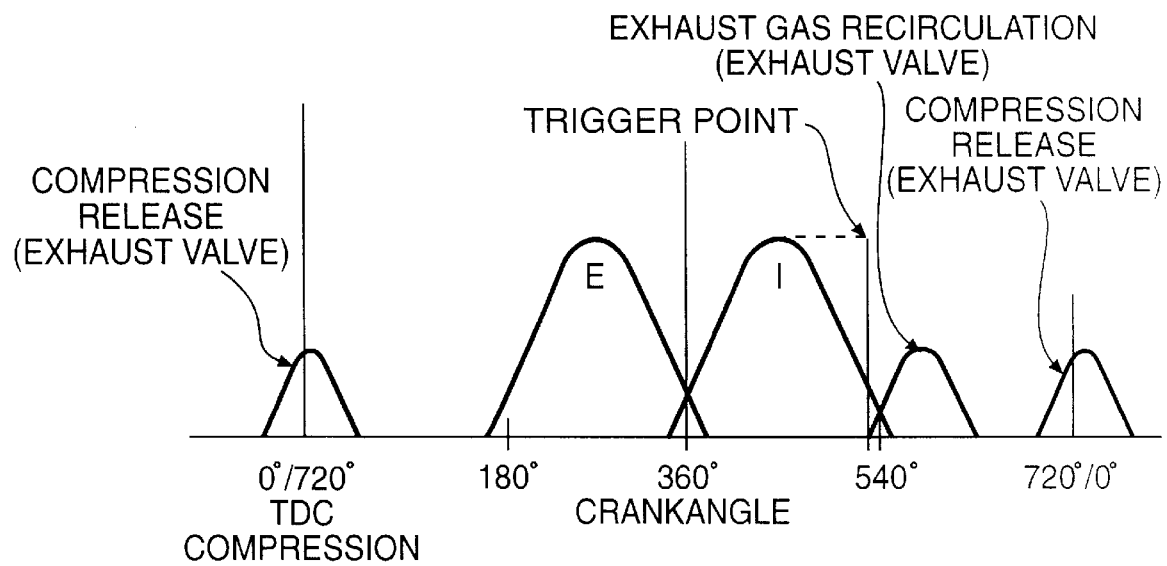
FIG. 6 is a graph depicting valve motion of the exhaust (E) and intake (I) valves, of the present invention, during compression release retarder operation, with exhaust gas recirculation, using the intake master piston to provide exhaust gas recirculation and the exhaust master piston or an external source to trigger the compression release retarding event.

FIGS. 5–8 depict one mode of operation of the system and method of the present invention. FIG. 5 depicts valve motion on positive power with the exhaust gas recirculation invention of the present invention. As shown in FIG. 5, the motion necessary to accomplish the opening of the exhaust valve to achieve exhaust gas recirculation is derived from a master piston cooperating with an intake valve train of the engine. The exhaust gas recirculation valve lift is triggered at the point shown in FIG. 5. FIG. 6 depicts the valve motion resulting from the use of a compression release retarder with the exhaust gas recirculation system and method of the present invention. The timing of the exhaust gas recirculation event, however, has been modified in order to exploit the benefits of the present invention. As was the case with FIG. 5, the system shown in FIG. 6 employs intake valve train motion to trigger the exhaust valve lift to accomplish exhaust gas recirculation. The timing of that triggering, however, is delayed to move the location of the exhaust gas recirculation event during the engine timing cycle. The exhaust valve motion to accomplish compression release braking is triggered either by the exhaust valve train of another cylinder or by an external trigger.

Figure 7:
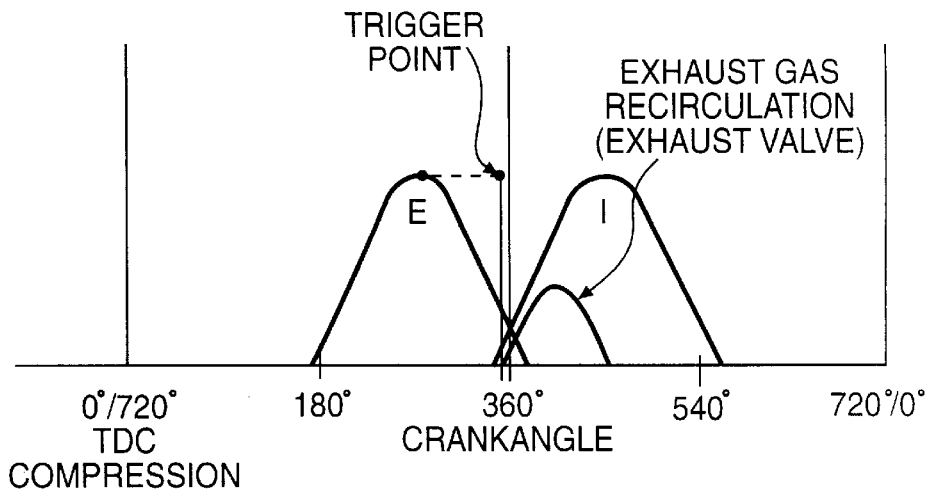
FIG. 7 is a graph depicting valve motion of the exhaust (E) and intake (I) valves, of the present invention, during positive power operation, with exhaust gas recirculation, using the exhaust master piston to trigger the exhaust gas recirculation event.

The present invention of employing an independent trigger, allows modification of the point of beginning, total magnitude of the lift, and the ending point of the exhaust gas recirculation valve lift. This provides the system with far greater control over the flow of air and gases into the cylinder. FIG. 7 depicts valve motion on positive power with exhaust gas recirculation of the present invention. FIG. 7 depicts, at least in some measure, the flexibility that can be obtained by use of the present invention. As opposed to FIG. 5, in which the exhaust gas recirculation event was desired to occur during the latter half of the intake stroke, in some situations it is desirable to advance the exhaust gas recirculation event to a point earlier in the engine cycle. FIG. 7 depicts the flexibility that can be permitted with the present invention in modifying the timing of the exhaust gas recirculation event. In contrast to FIG. 5, in which the exhaust valve was triggered by a master piston communicating with intake valve train, the embodiment shown in FIG. 7 employs a master piston communicating with an exhaust valve train. The exhaust valve trigger allows the system to advance the timing of the exhaust gas recirculation event to a point in the cycle earlier than would be feasible using an intake valve train.

Figure 8:
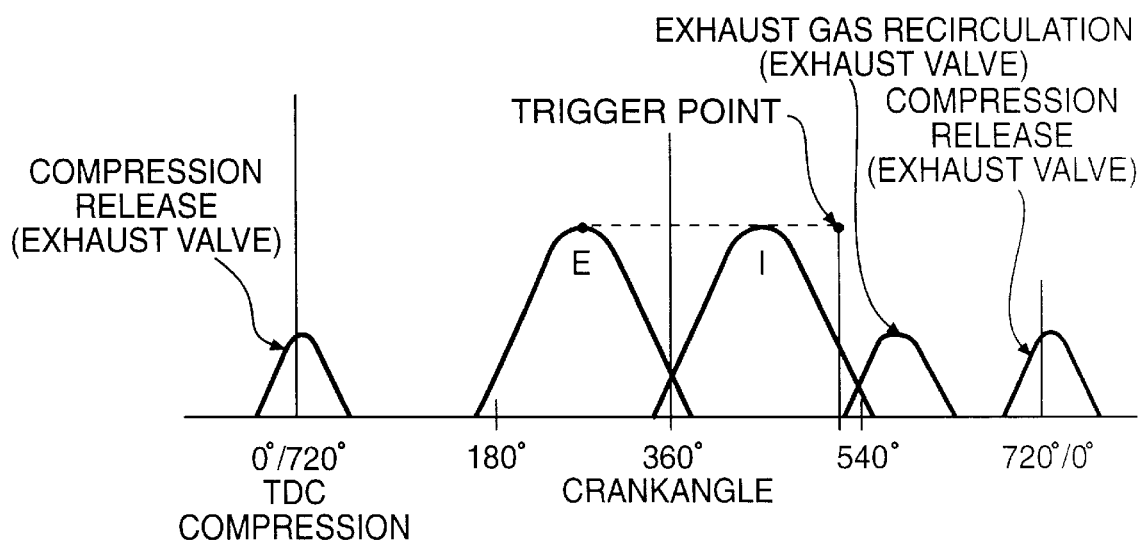
FIG. 8 is a graph depicting valve motion of the exhaust (E) and intake (I) valves, of the present invention, during compression release retarding operation, with exhaust air recirculation, using the exhaust master piston to provide the exhaust air recirculation event, and the exhaust or intake master piston, or an external source, to provide the compression release event.

FIG. 8 depicts valve motion using a compression release retarder with exhaust gas recirculation of the present invention. As in FIG. 7, the exhaust valve that is being actuated to accomplish exhaust gas recirculation is accomplished by a master piston communicating with an exhaust valve train. FIG. 8 depicts that in addition to advancing the timing of the exhaust gas recirculation event by use of an exhaust rather than an intake trigger, the timing can also be delayed to accomplish the exhaust gas recirculation event depicted in FIG. 8.

Figure 9:
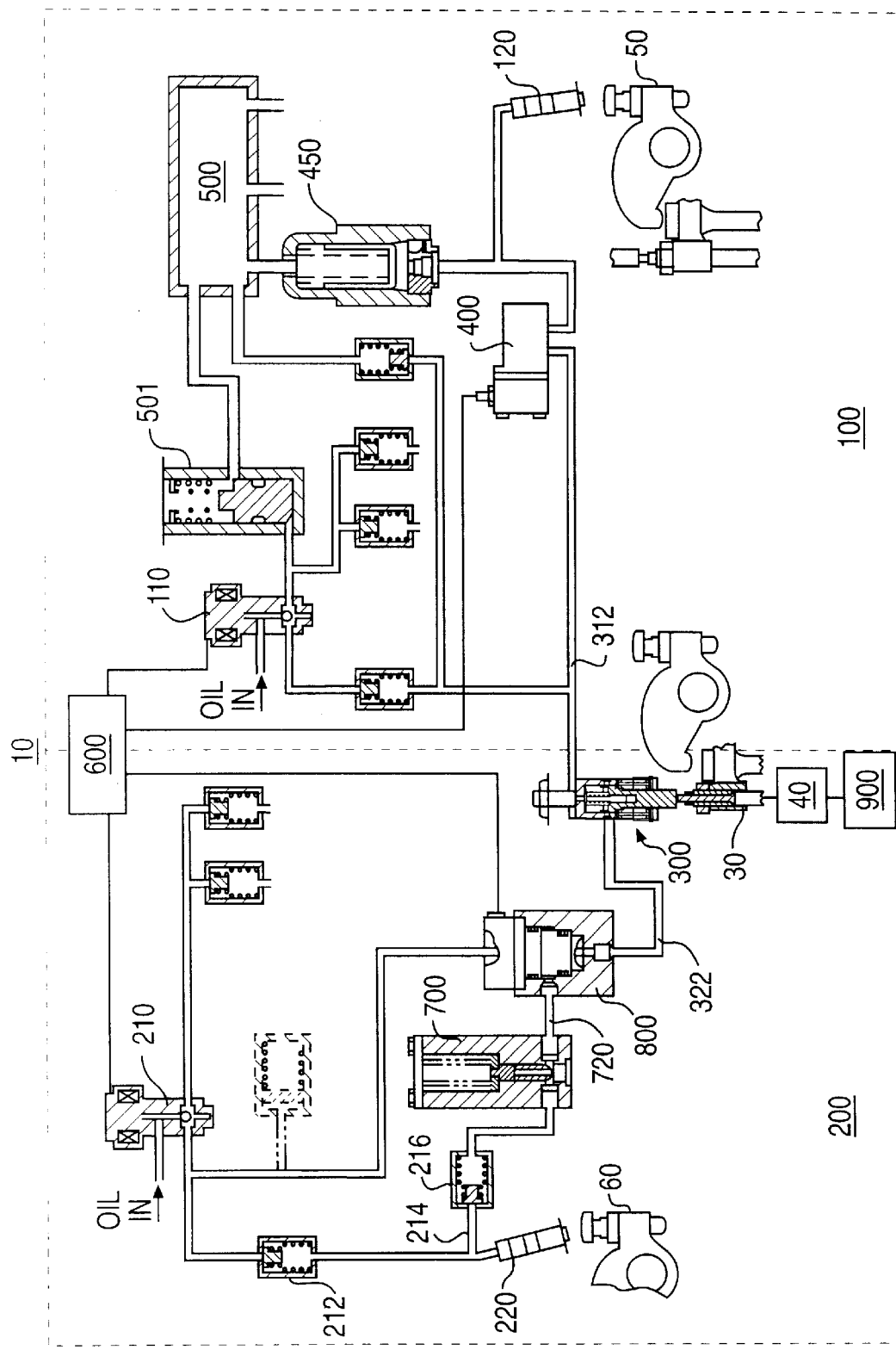
FIG. 9 is a schematic diagram of a preferred embodiment of the present exhaust gas recirculation invention and the common rail circuit for opening exhaust valves to achieve compression release retarding.

FIG. 9 depicts the system 10 of the present invention.

Figure 10:
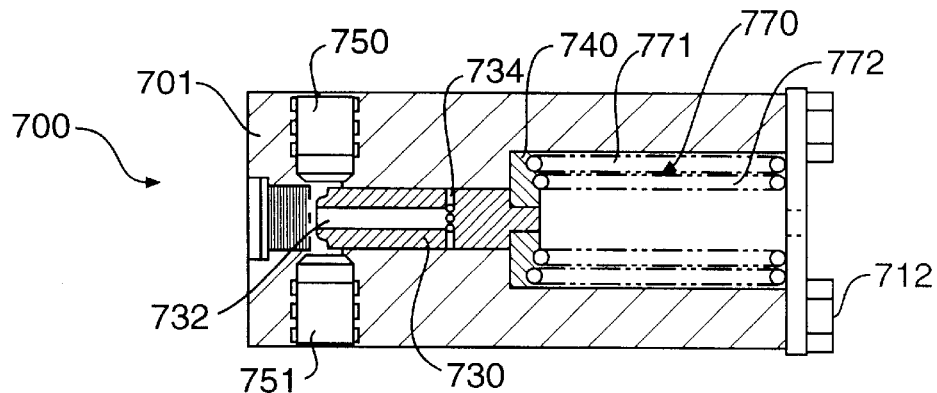
FIGS. 10–12 are cross-sectional diagrams of the delay piston of a preferred embodiment of FIG. 9, in various modes of operation, for opening exhaust valves to achieve compression release retarding.
Figure 11:
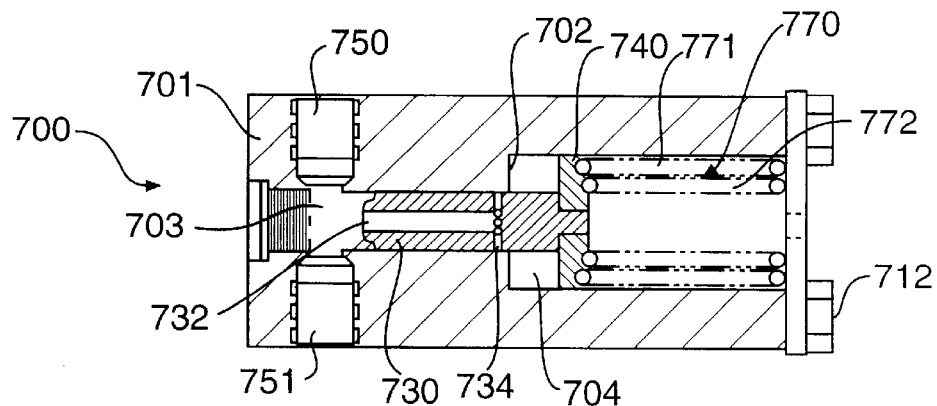
Figure 12:
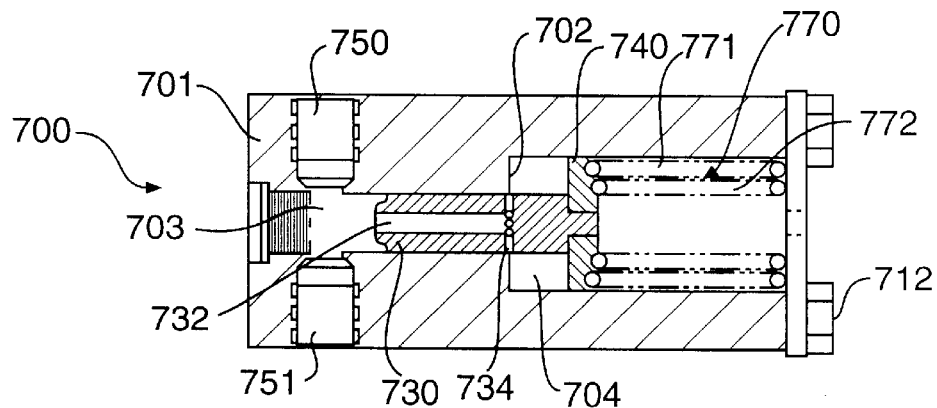

FIGS. 10–12 depict a delay piston subassembly 700 of the exhaust gas recirculation means 200 of the present invention.

FIGS. 13–18 are cross-sectioned views of a present preferred embodiment the slave piston subassembly 300.

FIG. 19 is an operating schematic diagram, and FIGS. 20 and 21 are operating tables, of a preferred embodiment of the present invention for a typical, in-line, six (6) cylinder, four cycle engine having a 1-5-3-6-2-4 firing order. FIGS. 19–21 depict the relationships between the slave pistons and the master pistons of the six (6) cylinders during compression release retarding and exhaust gas recirculation.

FIGS. 35–38 depict the correlation between exhaust manifold pressure and the timing of the exhaust valve lift to accomplish exhaust gas recirculation of the present invention. Depending on the results desired in terms of engine performance, the timing of the exhaust valve lift to accomplish exhaust gas recirculation can be modified. Depending on the timing of exhaust gas recirculation opening, the variation of magnitude of the exhaust manifold pressure can be utilized to control the flow of exhaust gas to the cylinder. Depending on the exhaust manifold pressure profile at various times in the engine cycle, advancing or retarding the timing of the exhaust gas recirculation lift will allow more or less exhaust gases to flow into the cylinder on intake. FIGS. 35–38 depict the correlation with various points of the manifold pressure profile depending on the modification of the timing of the exhaust valve lift.

Figure 39:
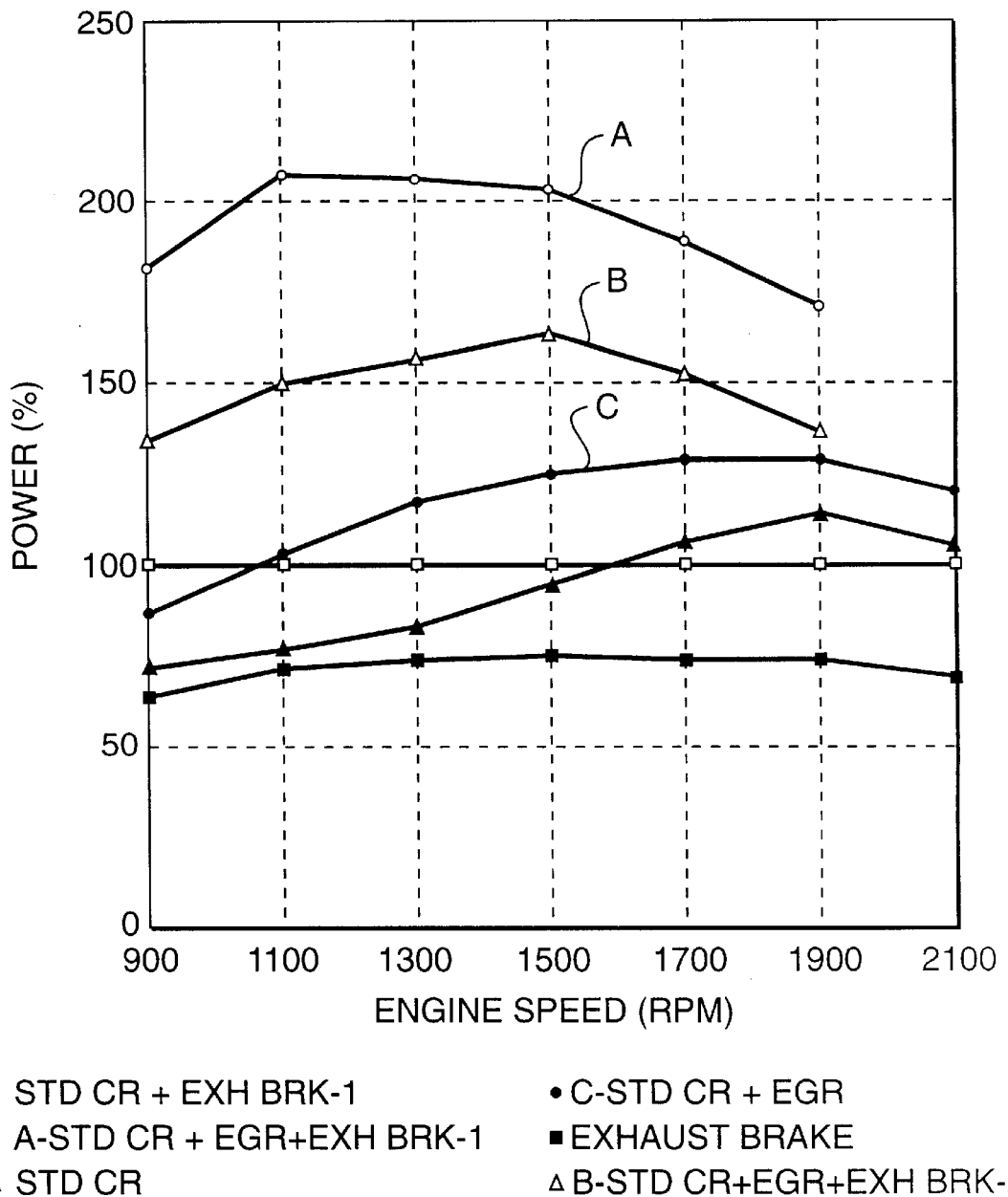
FIG. 39 is a graph of power developed by a preferred embodiment of the present invention, by modifying the operating parameters to exploit the benefits of the invention, while staying within engine design limits.

FIG. 39 is a graph depicting the power available from the present invention at various operating speeds. In particular, FIG. 39 indicates how the present invention can be modified and employed to achieve consistently high retarding performance without exceeding valve train component limitations, and without requiring any modification of valve train kinematics. FIG. 39 depicts the performance of various system operating configurations at various rpm levels. Line A represents the relative performance of a compression release retarder run in combination with an exhaust retarder with exhaust gas recirculation of the present invention. The power generated by this configuration is relatively high, even at low rpm levels. If the rpm values were allowed to increase, the exhaust temperature would exceed the engine operating limits.

Line B depicts a modification of the same structure as line A to accommodate these engine limitations. The orifice on the exhaust retarder component has been modified to provide a larger orifice, namely, less exhaust manifold pressure. The decrease in exhaust gas pressure, while impairing overall power developed by the braking system, allows the system to maintain itself within the engine manufacturer design limits.

Line C depicts the performance of the braking system without an exhaust restriction but with exhaust gas recirculation incorporated. Once again, although retarding power at the same rpm is reduced, the reduction allows the retarding system to continue to operate at higher rpms while still staying within the engine manufacturer's design limits and developing substantially higher power than equivalent system without exhaust gas recirculation.

FIG. 39 illustrates how operation of the braking system of the present invention provides enhanced retarding performance at lower rpm levels, yet, still provides flexibility for tailoring the retarding power developed by the invention to the operator's needs at various engine speeds.

It will be apparent to those skilled in the art that various modifications and variations can be made in the construction and configuration of the present invention, without departing from the scope or spirit of the invention. For example, in the general description above, the triggering system can be modified to derive the motion used to trigger the actuation of the exhaust valve to accomplish exhaust gas recirculation from either an intake or exhaust valve, depending on the timing desired. Furthermore, the triggering system may simultaneously trigger the actuation of more than one exhaust valve. Additionally, the opening, closing, and magnitude of the valve lift can all be modified. Moreover, the retarding systems that are engaged at any particular rpm level, as well as their fine adjustment, can all be modified to achieve the desired level of retarding, or to optimize the level of retarding at a particular rpm. The result is the improved fuel economy and quality of emission control when the engine is in a positive power producing mode. Thus, it is intended that the present invention cover the modifications at variations of the invention, provided they come within the scope of the appended claims and their equivalence. Reference will now be made in greater detail to a present preferred embodiment, and to other alternative embodiments of the system 10 and various subsystems, of the present invention.

Turning now more specifically to the features of a preferred embodiment of the present invention, as shown in FIG. 9, the invention may include four elements: (i) a means for deriving energy or motion 120 from the engine connected to (ii) an energy storage means 500, which may be connected to (iii) a means for controlling the application of the stored energy 400, which may be connected to (iv) a means for actuating valve movement 300 with the stored energy.

The means for deriving energy 120 from the engine may be any apparatus capable of converting kinetic, thermal, or electrical energy from an engine 20 into a form of energy which can be stored for later use. For example, the means for deriving energy 120 may include any apparatus that converts the movement of an engine part (e.g. cam, push tube, rocker arm, etc.) into a mechanical, hydro-mechanical, or hydraulic force and/or motion, or even into electrical power.

The energy storage means 500 may include any apparatus that can store energy of the form received by the means for deriving energy 120. If the energy received from the means for deriving energy 120 is in the form of a mechanical or hydraulic force, the energy storage means 500 may be a pressurized chamber, or plenum, of hydraulic fluid. If the received energy is in the form of electrical power, the energy storage means may be a battery, motorized flywheel, or other apparatus for storing electrical power.

The means for controlling the application of stored energy 400 may be any apparatus that can control the timing and/or amount of energy released from the energy storage means 500. For energy in the form of hydraulic force, the means for controlling 400 may be a solenoid-controlled trigger valve. For energy in the form of electricity, the means for controlling may be an electrically-controlled circuit that is opened and closed at selective intervals and which includes circuitry that ensures that the electrical signal, that is sent from the means for controlling, has the necessary voltage and current to open an engine valve.

The means for actuating valve movement 300 may be any electrical, mechanical, or hydraulic means that can utilize the energy received from the energy storage means 500 to open an engine valve 30. The means for actuating valve movement 300 is not limited to the opening of a single engine valve 30; rather multiple valve actuation is contemplated to be within the scope of the present invention.

It will be apparent to one of ordinary skill in the art that various modification in the construction and configuration of the present invention, without departing from the scope or spirit of the invention. For example, the means for deriving energy 120 and the means for controlling the application of stored energy 400 can be the same or different structures. In the embodiment depicted in FIG. 9, the means for deriving energy 120 and the means for controlling the application of stored energy 400 are separate units. However, a means for deriving energy 120 and the means for controlling the application of stored energy 400 can be connected to form an integral unit and is contemplated and considered to be within the scope of the present invention. Although the means for controlling the application of stored energy 400, as shown in FIG. 9, is electronically operated, it is contemplated that the means can be mechanically controlled. What is important is that they be adapted to perform their respective functions at independent times. For example, means 120 and 400 can be any of the following structures or any combination of them: intake valve train (rocker arms, push tubes, cams, hydraulic tappets, or other components); exhaust valve train (rocker arms, push tubes, cams, hydraulic tappets, or other components); dedicated cam; injector train (rocker arms, push tubes, cams, hydraulic tappets, or other components); external source; or any other appropriate components of the engine that provide a suitable source of energy. Although the inventors presently believe that it is preferable to use different structures for these two means 120 and 400, any appropriate means is considered to be part of the invention provided it is capable of triggering at independent times. The inventors unique system is fully flexible. Accordingly, triggering at fixed times is also contemplated to be within the scope of the present invention.

In a preferred embodiment of the present invention as shown in FIG. 9, compression release means 100 is a "common rail" system for actuating the exhaust valve 30 of a cylinder 40 on a compression stroke. (As embodied herein, compression release means 100 of the present invention could, alternatively, comprise a standard compression release engine retarder of a type well known in the art, such as the traditional "Jake Brake" retarder.) In a preferred embodiment of the present invention, compression release means 100 includes means for deriving energy 120; valve actuation means 300 and transfer means.

As embodied herein, energy deriving means 120 cooperates with transfer means, by supplying input in the form of either motion or energy. Transfer means cooperates with valve actuation means 300, which opens valve 30.

As shown in FIG. 9, transfer means may comprise storage means 500, trigger valve means 400, and control means 600. The transfer means may also include conduit 312 and other passages that interconnect the storage 500, trigger valve means 400 and slave piston 300. In a preferred embodiment of the present invention, energy deriving means 120 is a master piston. In a preferred embodiment, switch means 110 is a low pressure solenoid valve. Storage means 500 may be a plenum. When actuated, solenoid 110 fills compression release means 100 with hydraulic fluid. Once filled, compression release means 100 derives motion from exhaust rocker arm 50 by master piston 120. Specifically, master piston 120 pumps hydraulic fluid to plenum 500. Upon receiving a signal from control means 600, trigger valve 400 releases hydraulic fluid from plenum 500 to slave piston 300. A delay piston 450 may be provided between the plenum 500 and the trigger valve 400. Slave piston 300 then causes valve 30 to open on the compression stroke of the cylinder 40 near top dead center, to effect compression release braking. The control means 600 may be programmed such that optimal valve opening and closing times, are provided depending upon various engine parameters, such as rpm, temperature etc., input to the control means 600.

In a preferred embodiment of the present invention, as shown in FIG. 9, exhaust gas recirculation means 200 is a system for actuating exhaust valve 30 of a cylinder 40. Unlike the compression release event, which occurs near top dead center compression, the exhaust gas recirculation event occurs during intake or at the beginning of the compression stroke.

In a preferred embodiment of the present invention as shown in FIG. 9, exhaust gas recirculation means 200 includes means for deriving energy 220, slave piston 300 and transfer means. As embodied herein, energy deriving means 220 cooperates with transfer means, by supplying input in the form of motion and energy. Transfer means cooperates with slave piston 300, which opens valve 30.

As shown in FIG. 9, transfer means comprises energy storage means 700, trigger valve (e.g. high speed solenoid) 800, and control means 600. In a preferred embodiment of the present invention, energy deriving means 220 is a master piston. Switch means 210 is a low pressure solenoid valve. Energy storage means 700 is a delay piston subassembly. High speed solenoid valve 800 is a three-way trigger valve. When actuated, solenoid 210 fills exhaust gas recirculation means 200 with hydraulic fluid. Once filled, exhaust gas recirculation means 200 derives energy from cam or valve train 60 by master piston 220. Specifically, master piston 220 pumps hydraulic fluid to delay piston subassembly 700. Upon receiving a signal from control means 600, trigger valve 800 releases hydraulic fluid from delay piston subassembly 700 to slave piston 300. Slave piston 300 then causes valve 30 to open on the intake or early compression stroke of the cylinder 40 to provide exhaust gas recirculation in cylinder 40.

Continuing with the embodiments shown in the accompanying figures, FIGS. 10–12 depict a cross-sectional view of a preferred embodiment of the energy storage means 700 of the present invention. In a preferred embodiment of the present invention, energy storage means 700 is a delay piston subassembly, comprising of energy storing means 770, retainer means 712, and piston means 730. FIG. 10 depicts the delay piston subassembly 700 in the "off" position. In that position, piston means 730 is engaged but not loaded by energy storing means 770 and has moved to the left in the cooperating cavity 703 formed in the body 701 of delay piston subassembly 700.

As the piston means 730 is charged, hydraulic fluid from master piston 220 is admitted to port 750 formed in delay piston body 701. Port 751 connects the delay piston subassembly 700 to three-way trigger valve 800. The high pressured hydraulic fluid impinges against the end of piston means 730 forcing it to the right, as shown in FIG. 11. As the cavity 703 formed in delay piston subassembly 700 fills with high pressure hydraulic fluid through port 750, hydraulic fluid also travels through bore 732 formed in the piston means 730. With the continuing addition of high pressure hydraulic fluid, piston means 730 pushes against retaining plate 740, compressing springs 771 and 772 of the energy storing means 770. Compression of springs 771 and 772 continues until the flow of hydraulic fluid stops at the end of travel of master piston 220. Apertures 734 are in communication with bore 732. This arrangement provides overtravel protection in the case of an excessive amount of hydraulic fluid pumped into delay piston subassembly 700 (e.g., in the case of the failure of the electronic trigger to release the temporarily stored hydraulic fluid), depicted in FIG. 12). As high pressure hydraulic fluid forces piston means 730 to the right, bore 732 admits high pressure hydraulic fluid to apertures 734. Apertures 734, however, are occluded by the wall of the delay piston body 701 in which piston means 730 travels. When piston means 730 has traveled a sufficient distance that apertures 734 clear shoulder 702 formed on the interior of delay piston body 701, apertures 734 then bleed high pressure hydraulic fluid into cavity 704, protecting against excessive travel of piston means 730. Thus, protecting the system from damage.

It will be apparent to those of skill in the art that the energy storing means 770 is not limited to compression springs 771 and 772. Rather other energy storing means including, but not limited to, hydraulic fluid, gas, mechanical flat springs and other compressible materials, provided they are capable of temporarily storing and releasing energy are contemplated. Furthermore, the energy storage means or delay piston subassembly 700 is not limited to the spring loaded assembly, described above. Other energy storage means including but not limited to mechanical devices utilizing hydraulic fluid or gas, electronic devices and other devices capable of storing and releasing energy are contemplated to be within the scope of the present invention. Thus, it is intended that the present invention cover all the variations and modifications of the invention, provided they come within the scope of the appended claims and their equivalents.

Figure 13:
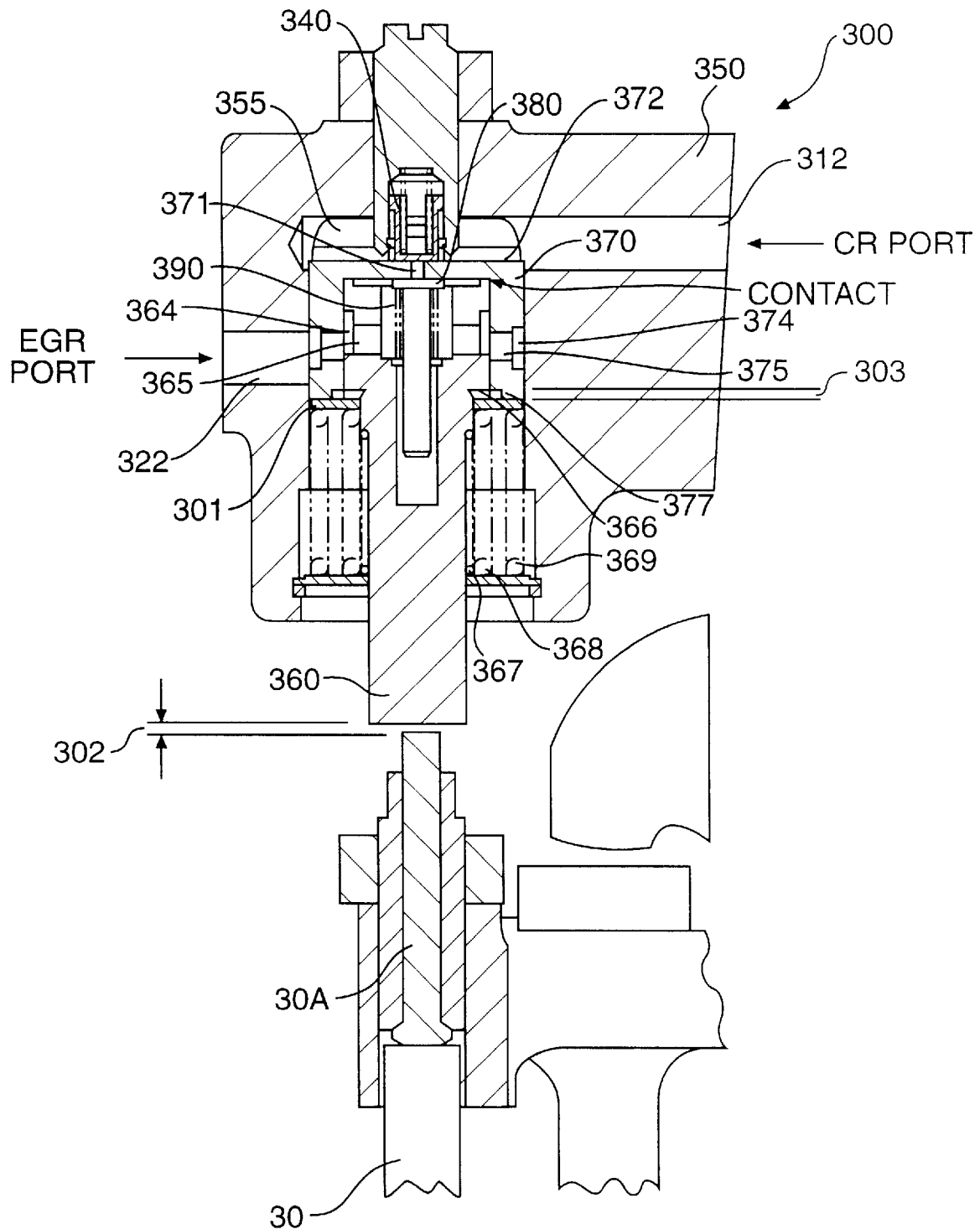
FIG. 13 is a cross-sectional view of a present preferred embodiment the slave piston subassembly of FIG. 9 depicting the slave piston in the "off" position.

FIGS. 13–18 depict a preferred embodiment of the slave piston subassembly 300 of the present invention. The preferred embodiment of the slave piston subassembly 300 of the present invention includes slave piston housing 350, inner slave piston 360, outer slave piston 370, internal relief valve pin 380, and internal relief valve spring 390. FIG. 13 depicts slave piston subassembly 300 in the "off" position, that is when the slave piston subassembly 300 is not actuated by either the exhaust gas recirculation means 200 through conduit 322 or the compression release retarding means 100 through conduit 312. In the "off" position, inner and outer slave pistons 360 and 370, respectively, are biased by at least one spring 368 and/or 369 and spring 367 upward into cavity 355 in slave piston housing 350. Low pressure hydraulic fluid is supplied through conduit 312 from the compression release retarding means 100. Internal relief valve spring 390 biases internal relief valve pin 380 against the under side of outer slave piston 370, covering the relief valve aperture 371 formed in the outer slave piston 370.

Figure 15:
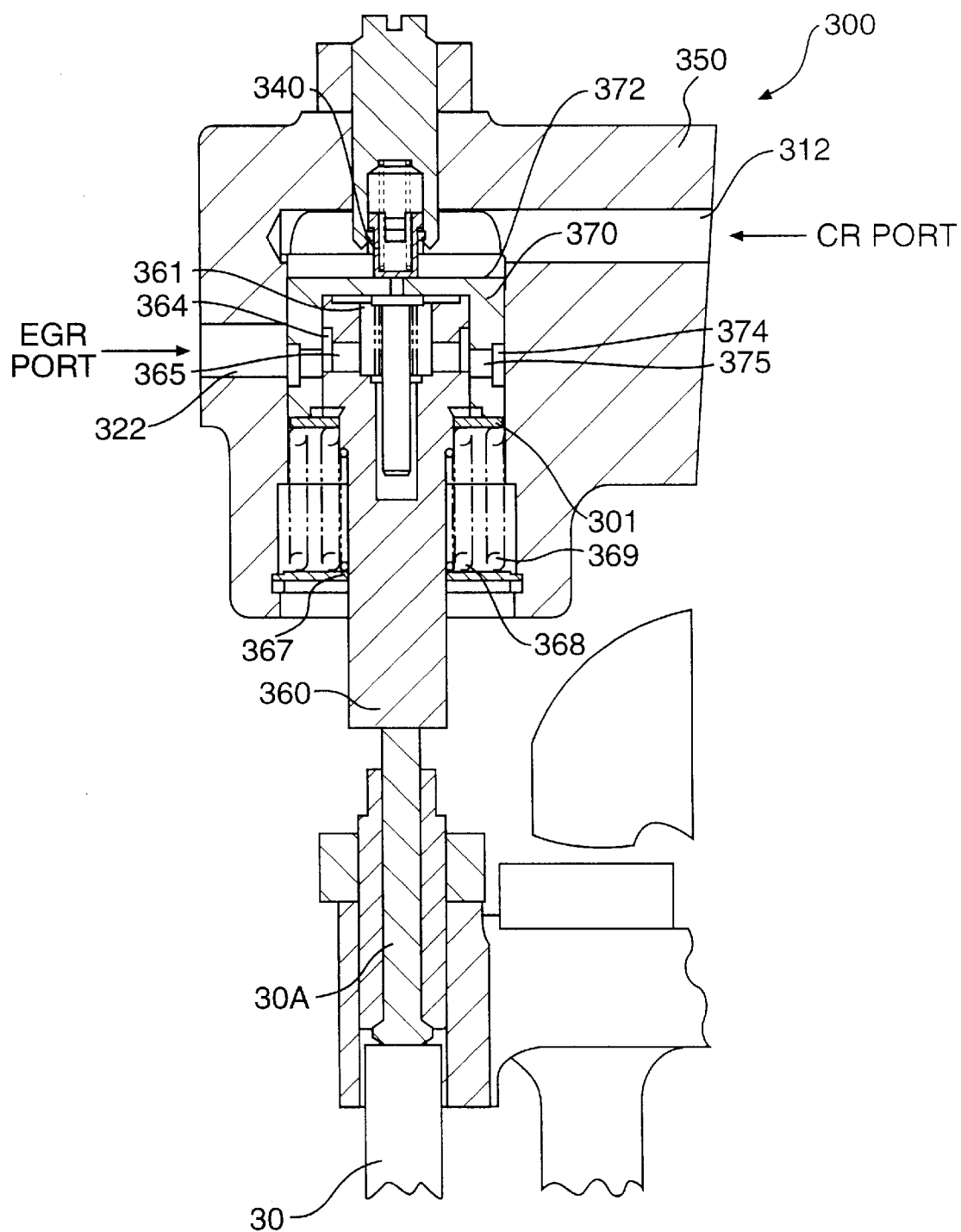
FIG. 15 is a cross-sectional view of the slave piston subassembly of FIG. 9 depicting the slave piston compression release stroke, for activating an exhaust valve to achieve compression release retarding.

At the beginning of a compression release retarding stroke, high pressure hydraulic fluid is supplied through conduit 312 to the top surface 372 of outer slave piston 370, as shown in FIG. 15. The high pressure hydraulic fluid forces outer slave piston 370 to move downward, abutting inner slave piston 360, and forcing the entire slave piston assembly 300 in a downward direction through cavity 355. During the course of its downward travel, plunger 340 travels with outer slave piston 370, occluding relief valve aperture 371, as shown in FIG. 15.

Figure 16:
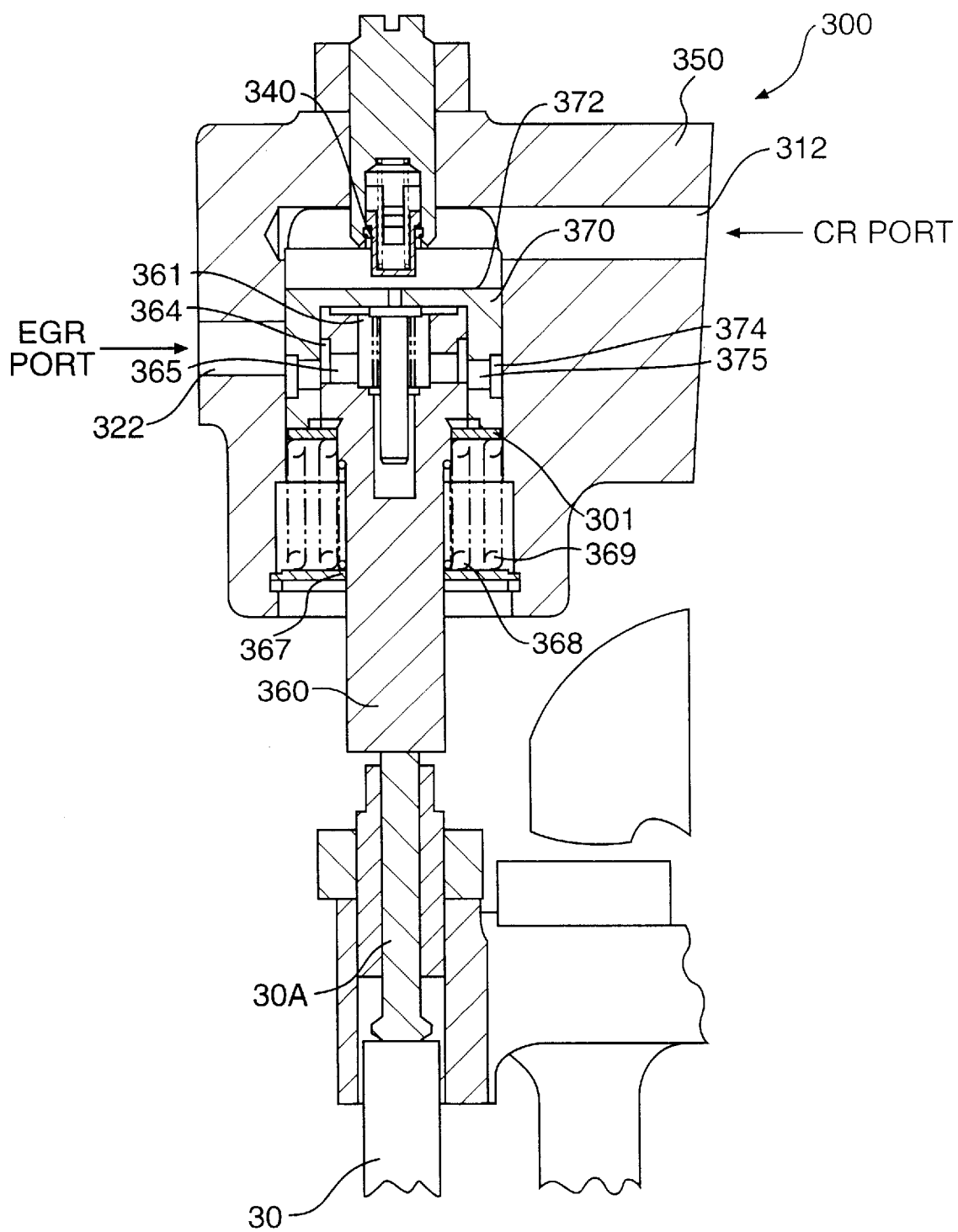
FIG. 16 is a cross-sectional view of the slave piston subassembly of FIG. 9 depicting the slave piston compression release stroke, in the overtravel mode of operation of the device of FIG. 14.

In a preferred embodiment of the present invention, slave piston subassembly 300 also has means to prevent overtravel, as shown in FIG. 16. Although plunger 340 travels downward with outer slave piston 370, plunger 340 has a limited stroke. Once outer slave piston 370 has traveled downward through cavity 355 a greater distance than the stroke of the plunger 340, plunger 340 uncovers relief valve aperture 371 formed in the top surface 372 of outer slave piston 370. Uncovering relief valve aperture 371 allows high pressure hydraulic fluid to travel through relief valve aperture 371, overcoming internal relief valve spring 390 and pushing internal relief valve pin 380 away from the underside of outer slave piston 370. High pressure hydraulic fluid then travels through the interior bore 361 of inner slave piston 360 and through apertures 365 by draining the high pressure hydraulic fluid from cavity 355 through internal relief valve and apertures 365, 375, and conduit 312 and via the exhaust gas recirculation means 200 into the engine lube system. The above-described overtravel means prevents the inner slave piston 360 from being driven downward an excessive distance during compression release. Thus, protecting the system from an uncontrolled excessive supply of hydraulic fluid during compression release.

In a preferred embodiment of the present invention, inner slave piston 360 also includes means to prevent overtravel under the influence of the exhaust gas recirculation means 200. As embodied herein, high pressure hydraulic fluid is supplied from the exhaust gas recirculation system 200 to conduit 322. Conduit 322 communicates with apertures 375 in outer slave piston 370, admitting high pressured, hydraulic fluid from the exhaust gas recirculation means 200 of the present invention to inner slave piston 360 via aperture 365 and bore 361 to slave piston 360. During the exhaust gas recirculation stroke, outer slave piston 370 is disposed in the top portion of cavity 355. Only low pressured hydraulic fluid is supplied to cavity 355 through conduit 322, allowing outer slave piston 370 to stay in place in the upper portion of cavity 355. High pressure, hydraulic fluid is supplied from the exhaust gas recirculation means 200 of the present invention through conduit 322. As embodied herein, outer slave piston 370 has an annular groove 374 formed in the perimeter thereof communicating with apertures 375. High pressure, hydraulic fluid admitted by conduit 322 communicates with the annular groove 374, apertures 375 and 365 to bore 361 to act on inner slave piston 360.

Figure 17:
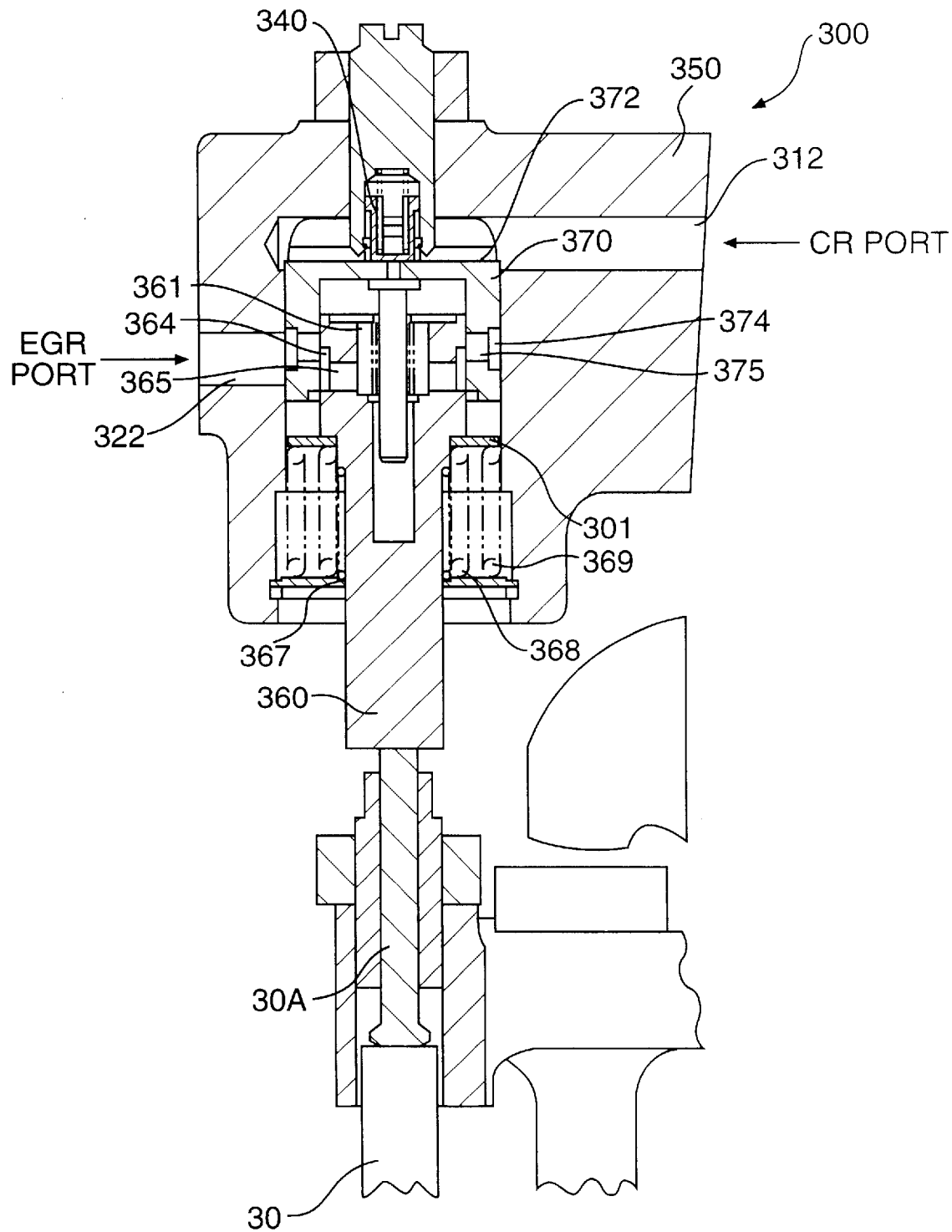
FIG. 17 is a cross-sectional view of the slave piston subassembly of FIG. 9 depicting the slave piston exhaust gas recirculation stroke, for activating an exhaust valve to achieve exhaust gas recirculation.

As high pressure, hydraulic fluid is delivered to inner slave piston 360 through conduit 322, annular groove 374 and apertures 375, inner slave piston 360 moves downward within outer slave piston 370. As high pressure, hydraulic fluid is admitted to the interior of inner slave piston 360, it expands the space between the upper portion of inner slave piston 360 and the under side of outer slave piston 370, as shown in FIG. 17. As inner slave piston 360 slides downward within outer slave piston 370, internal relief valve spring 390 biases internal relief valve pin 380 against the under side of outer slave piston 370, occluding internal relief valve aperture 371.

Figure 18:
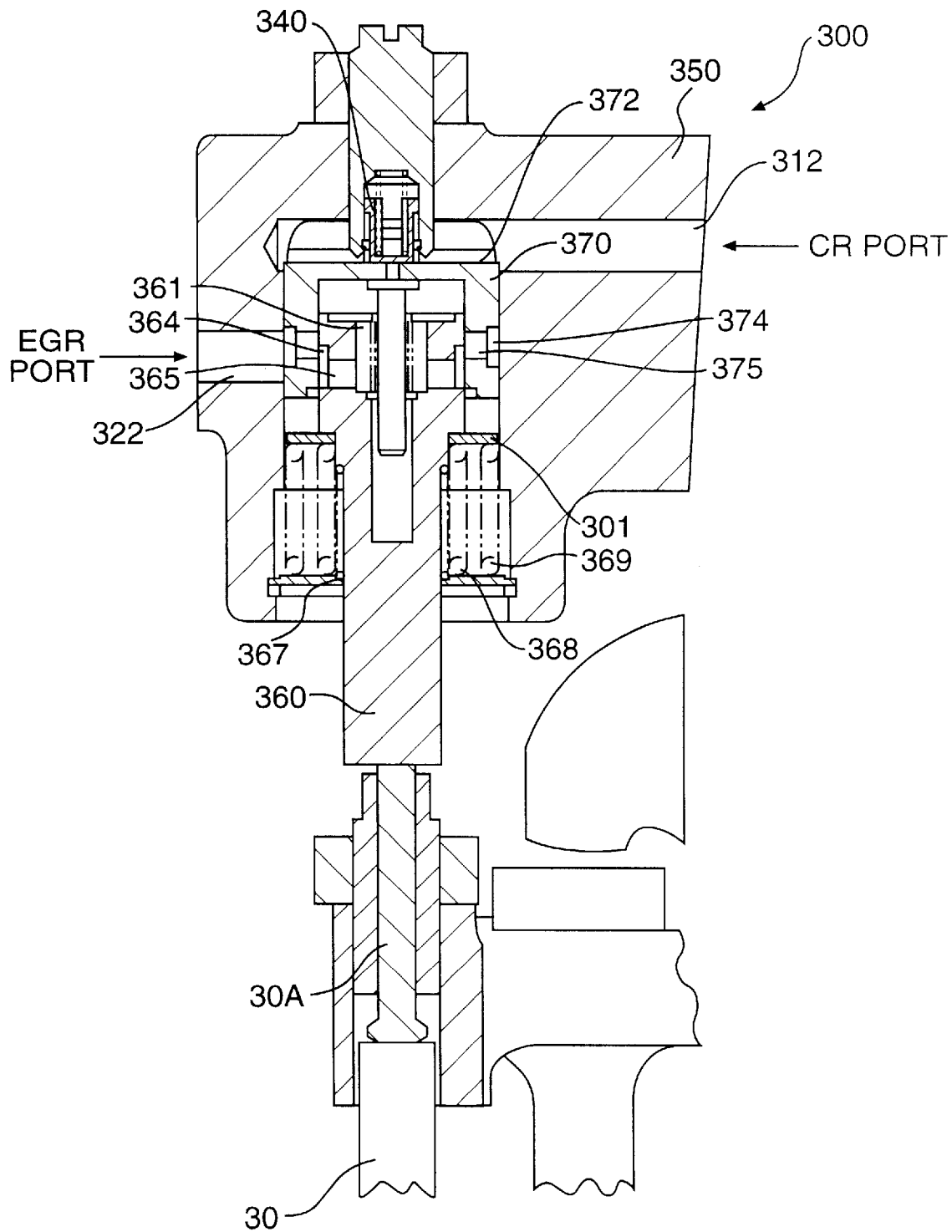
FIG. 18 is a cross-sectional view of the slave piston subassembly of FIG. 9 depicting the slave piston exhaust gas recirculation stroke, in the overtravel mode of operation of the device of FIG. 14.

As did outer slave piston 370, inner slave piston 360 also includes overtravel limiting means in a preferred embodiment of the present invention. The lower surface of outer slave piston 370 has relief grooves 377 formed therein. As inner slave piston 360 moves downward through outer slave piston 370, the annular groove 364 in inner slave piston 360 reaches the level of the relief grooves 377 cut in the lower surface of outer slave piston 370, opening up a communication between the space between inner slave piston 360 and outer slave piston 370 and the area in the interior of slave piston subassembly 300 in which the springs 368 and 369 are disposed, as shown in FIG. 18. Once the inner slave piston 360 has traveled downward a far enough distance to reach the upper portion of the grooves 377 of outer slave piston 370, a communication is opened allowing high pressure, hydraulic fluid to drain from conduit 312 through the interior of inner slave piston 360, thus, preventing overtravel of the inner slave piston 360.

Figure 14:
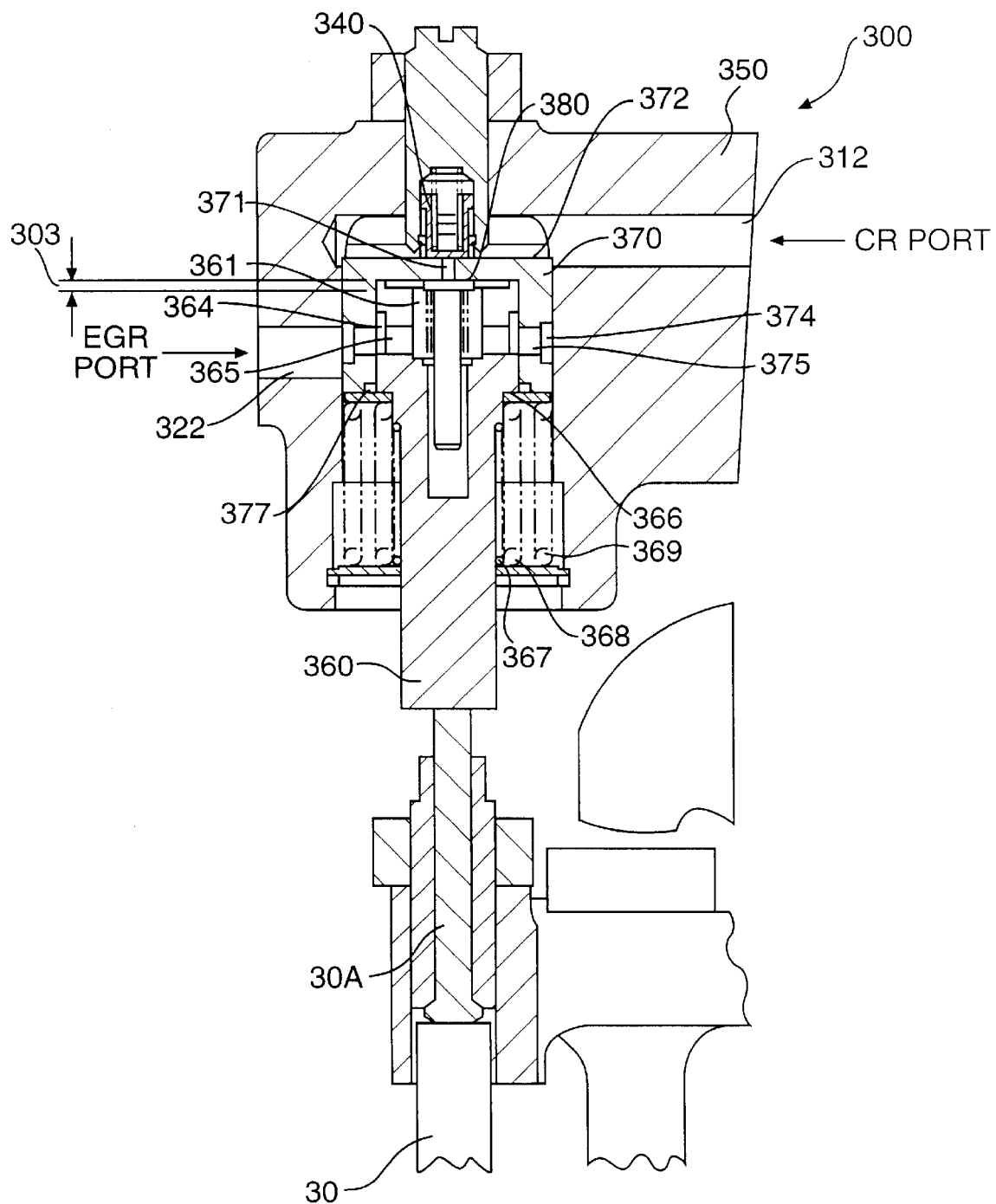
FIG. 14 is a cross-sectional view of a present preferred embodiment the slave piston subassembly of FIG. 9 depicting the slave piston in the "on" position.

In a preferred embodiment of slave piston assembly 300 of the present invention, the slave piston assembly 300 contains means to provide multiple lash settings. A first lash setting is shown in FIG. 13 in which a gap 302 exists between the lower surface of the inner slave piston 360 and the actuator pin 30A. The first lash setting is used during the compression release retarding operation during which the inner and outer slave pistons 360 and 370 travel together within housing 350. A second lash setting is provided during the exhaust gas recirculation. Inner slave piston 360 has a surface 366. As low pressure hydraulic fluid enters the inner slave piston 360 through groove 374 and apertures 365 and 375, groove 364 and bore 361, the inner slave piston 360 is moved downward overcoming the bias of spring 367. The surface 366 contacts washer 301 reducing or closing the gap 302 between the inner slave piston 360 and the actuator pin 30A, as shown in FIG. 14. A gap or lash 303 is established between the upper slave piston 370 and the inner slave piston 360. The amount of closure of gap 302 is the result of the difference between gap 302 and 303. The closure amount is equal to the difference between gap 302 and gap 303, which is never less than zero.

The above-described slave piston subassembly 300 is described in connection with the operation of a single valve 30. However, the simultaneous operation of multiple valves is also contemplated to be within the scope of the present invention. For example, the lower portion of the inner slave piston 360 may include a forked assembly that is capable of engaging and operating multiple valves.

It will be apparent to one of ordinary skill in the art that the present invention is not limited to the use of compression springs in connection with the preferred embodiment of the slave piston subassembly. Rather other spring devices including, but not limited to hydraulic fluid, gas, mechanical flat springs, and other compressible materials may be substituted.

It will be apparent to one of ordinary skill in the art that various modifications and variations can be made to the present invention, without departing from the scope or spirit of the invention. For example, subsystem 100 could be a conventional compression release retarder of the type sold under the "Jake Brake" brand, or the improved method and apparatus described in this disclosure, or any other system capable of achieving compression release braking. Subsystem 200 could be modified to employ mechanical, electronic, magnetic, hydraulic, pneumatic, or other means for transmitting and storing energy.

In a preferred embodiment of the present invention as shown in FIG. 9, subsystems 100 and 200 are combined into a single system. However, subsystems 100 and 200 can be separate. Furthermore, it is not necessary for both subsystems 100 and 200 to be present. Although the present disclosure focusses primarily on the preferred embodiment of the present invention, the invention is not so limited. It is contemplated that each of these subsystems can be provided on an internal combustion engine separately or alone. Each of these permutations and variations is considered part of the invention. Thus, it is intended that the present invention cover the variations and modifications of the invention, provided they come within the scope of the appended claims and their equivalents.

The present invention will now be described in greater detail, with specific reference to various modes of operation.

Exhaust Gas Recirculation with Compression Release Retarding

The operation of a preferred embodiment of the present invention, where exhaust gas recirculation is provided on compression release braking, will now be described in greater detail. The fuel supply to the cylinders is interrupted and compression release retarder means 100 is enabled.

As shown in FIG. 9, exhaust gas recirculation is initiated by actuating low pressure solenoid valve 210. Hydraulic fluid fills the exhaust gas recirculation means 200, allowing master piston 220 to pump hydraulic fluid to energy storage means or delay piston subassembly 700 in response to the motion of rocker arm 60. Pressure builds up in delay piston subassembly 700 as described above. Upon receiving a signal from control means 600, trigger valve 800 releases hydraulic fluid from delay piston subassembly 700 to slave piston 300. Slave piston 300 then causes valve 30 to open on the intake stroke, or at the beginning of the compression stroke to effect exhaust gas recirculation. Control means 600 then causes the valve 800 to close, which causes valve 30 to close, early enough in its compression stroke to develop sufficient cylinder charge to effect compression release braking.

Compression release braking is enabled by actuating low pressure solenoid valve 110. Solenoid 110 admits hydraulic fluid to compression release retarding means 100 filling the compression release retarding means 100 with hydraulic fluid. Once filled with hydraulic fluid, compression release means 110 derives energy from exhaust rocker arm 50 by master piston 120. Master piston 120 follows and responds to the motion of exhaust rocker arm 50, and thereby pumps hydraulic fluid to energy storage means or plenum 500. At this point, trigger valve 400 is closed, allowing pressure to build up in plenum 500. Plenum 500 is also equipped with a dump control valve 501, which allows for turning the system on and off hydraulically. Energy storage means or plenum 500 quickly attains an operating pressure. Upon receiving a signal from control means 600, trigger valve 400 releases hydraulic fluid from plenum 500 through a high pressure conduit 312 to housing 350. Slave piston 300 is mounted in housing 350. Upon receiving the charge of hydraulic fluid from trigger 400, slave piston 300 moves, pushing valve 30 into cylinder 40. This forces valve 30 to open on the compression stroke of cylinder 40, near top dead center. This opening effects a compression release retarding event.

As a result of the exhaust gas recirculation event that preceded the compression release retarding, the cylinder developed higher compression than it otherwise might have.

The timing of the opening, closing, and magnitude of the opening of valve 30 can each be controlled by control means 600. There is a different and much stronger pattern of variation of the exhaust gas back pressure in the exhaust manifold, with compression release retarding, than on positive power. The timing and magnitude of the exhaust gas recirculation event can be modified to exploit these differences. This will be explained in greater detail below, with reference to combination braking, in which these differences are best exploited.

It will be apparent to one of ordinary skill in the art that the present invention is not limited to the present preferred embodiment. For example, the preferred embodiment of the present invention has been described with reference to a "common rail" system. Other compression release retarding systems can also be used, such as: a standard Jake Brake (hydraulic); any other of the various known compression release retarders (based upon the principles taught in U.S. Pat. No. 3,220,392); electronically-controlled common rail (energy storage released electronically instead of mechanically, as described in U.S. Pat. No. 4,706,624); dedicated cam; or any other appropriate actuation system for compression release retarding. Thus, it is intended that the present invention cover all the variations and modifications of the invention, provided they come within the scope of the appended claims and their equivalents.

Exhaust Gas Recirculation with Combination Braking

In a preferred embodiment of the present invention, as shown in FIG. 9, exhaust gas recirculation is provided on combination braking, which employs both exhaust and compression release retarders. In this mode of operation, fuel supply to the cylinders is again interrupted. Both the compression release retarding means 100 and exhaust retarder 900 are enabled.

As described above, exhaust gas recirculation is initiated by actuating low pressure solenoid valve 210. Hydraulic fluid fills the exhaust gas recirculation means 200, allowing master piston 220 to respond to the motion of rocker arm 60, pumping hydraulic fluid to delay piston subassembly 700. Pressure builds up in delay piston subassembly 700 as described above. Upon receiving a signal from control means 600, high speed solenoid valve 800 releases hydraulic fluid from delay piston subassembly 700 to slave piston 300. Slave piston 300 then causes valve 30 to open on the intake stroke, or at the beginning of the compression stroke to effect exhaust gas recirculation. Control means 600 then causes valve 30 to close, early enough in its compression stroke to develop sufficient cylinder charge to effect compression release braking and/or to selectively control the pressure in the exhaust manifold.

The operation of the exhaust brake, however, may significantly affect the exhaust gas recirculation event during combination braking. Specifically, the exhaust brake may significantly increase the pressure of exhaust gas trapped in the exhaust manifold. As a result, the differential between the exhaust manifold and the cylinder pressure during the exhaust gas recirculation event is significantly higher. More exhaust gas enters the cylinder on exhaust gas recirculation, than otherwise would enter, absent the exhaust brake.

Further, the release of a portion of the back pressure from the exhaust manifold to the cylinder during exhaust gas recirculation typically lowers the exhaust manifold back pressure, reducing the effectiveness of the exhaust brake. This drop in exhaust manifold pressure will also modify the pressure profile in the exhaust manifold.

Compression release braking is enabled as described above. In accordance with the present invention, any type of compression release retarder may be used. For example, the figures show a Jacobs retarder. Solenoid 110 admits hydraulic fluid that fills compression release retarding means 100. Master piston 120 responds to the motion of rocker arm 50, pumping hydraulic fluid to energy storage means or plenum 500. Upon receiving a signal from control means 600, trigger valve 400, releases hydraulic fluid from plenum 500 to slave piston subassembly 300, opening valve 30, near top dead center compression. As a result of the exhaust brake increasing the exhaust manifold pressure, the exhaust gas recirculation event that preceded the compression release increases the air mass admitted to the cylinder. This allows the cylinder to develop higher compression than it otherwise might have.

The timing of the opening, closing, and magnitude of the opening of valve 30 can each be controlled by control means 600. There is a higher level, and different pattern, of exhaust gas back pressure in the exhaust manifold, with combination braking. The timing and magnitude of the exhaust air recirculation event can be modified to exploit these differences.

It will be apparent to one of ordinary skill in the art that the present invention is not limited to the present preferred embodiments. For example, the preferred embodiment of the compression release components of the present invention have been described with reference to a "common rail" system. Other compression release retarding systems can also be used, such as: a standard Jake Brake (hydraulic); any other of the various known compression release retarders (based upon the principles taught in U.S. Pat. No. 3,220, 392); electronically-controlled common rail (energy storage released electronically instead of mechanically, as described in U.S. Pat. No. 4,706,624); dedicated cam; or any other appropriate actuation system for compression release retarding. The exhaust retarder component can be any of a variety of exhaust restrictor devices, including: a butterfly valve; a sliding gate (guillotine) valve; a turbocharger (standard, variable geometry, or other); by-pass valves; waste gate flow control devices; or any other device that is capable of restricting the outflow of exhaust gases. Exhaust back pressure control can be variable or fixed. Exhaust restrictors can be used to vary the exhaust manifold pressure. This can provide additional control over the timing and degree of recirculation, as well as over other operating parameters (temperature, etc.). Thus, it is intended that the present invention cover all the variations and modifications of the invention, provided they come within the scope of the appended claims and their equivalents.

Exhaust Gas Recirculation on Positive Power

The operation of a preferred embodiment of the present invention, in which exhaust gas recirculation is provided during positive power operation of the engine, will now be described in greater detail. In most respects, the operation of the exhaust gas recirculation subsystem of the invention for exhaust gas recirculation is substantially the same as that for retarding systems. On positive power, all retarder systems are disabled and the engine is fueled.

With renewed reference to FIG. 9, exhaust gas recirculation is initiated by actuating low pressure solenoid valve 210. Low pressure solenoid 210 admits hydraulic fluid through check valve 212, which fills exhaust gas recirculation means 200. Master piston 220, follows the motion of rocker arm 60 and pumps hydraulic fluid through a high pressure conduit 214. Master piston 220 pumps hydraulic fluid to delay piston subassembly 700. A check valve 216 prevents back flow of fluid from the delay piston subassembly 700.

The delay piston subassembly 700 is connected to the trigger valve 800 by a high pressure conduit 720. At this point, trigger valve 800 is closed. This traps hydraulic fluid in delay piston subassembly 700. Hydraulic fluid pressure builds in delay piston subassembly 700.

Upon receiving a signal from control means 600, trigger valve 800 releases hydraulic fluid from delay piston subassembly 700 through a high pressure conduit 322 to housing 350. Slave piston subassembly 300 is mounted in housing 350. Slave piston subassembly 300 then causes valve 30 to open on the intake stroke to effect exhaust gas recirculation. Control means 600 then causes the trigger valve 800 to close which causes valve 30 to close, early enough to allow normal compression and power operation of the cylinder. This allows a portion of the exhaust gases to be recirculated to the cylinder to obtain improved emission control and other benefits of exhaust gas recirculation.

It will be apparent to one of ordinary skill in the art that the present invention is not limited to the present preferred embodiment. The preferred embodiment of the present invention has been described with reference to FIG. 9. The invention can be used with or without any type of compression release or exhaust retarding, as previously discussed.

Optimizing Timing of Exhaust Gas Recirculation Events

Figure 35:
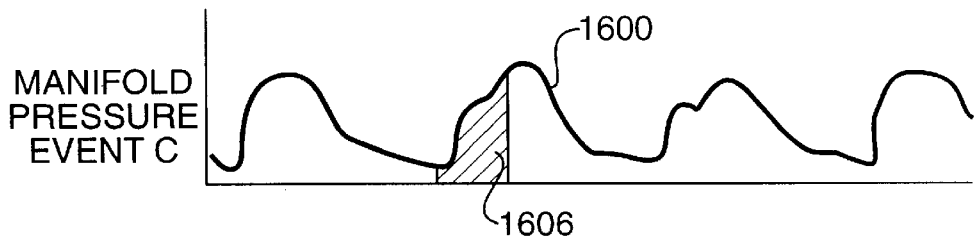
FIGS. 35–38 are graphs correlating exhaust manifold pressure with the timing of the exhaust gas recirculation event depicting the impact of the recirculation event on cylinder charge available to the cylinder on compression.
Figure 36:
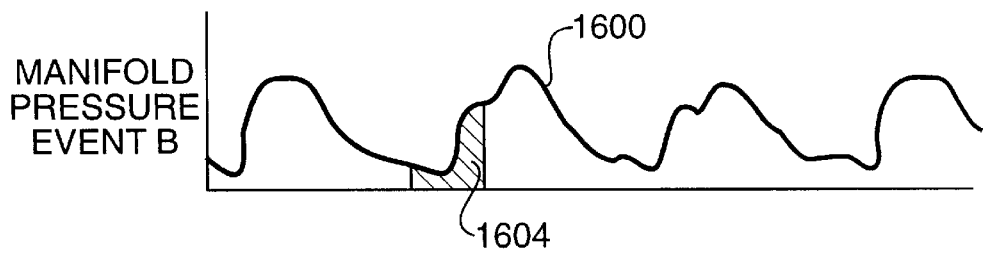
Figure 37:
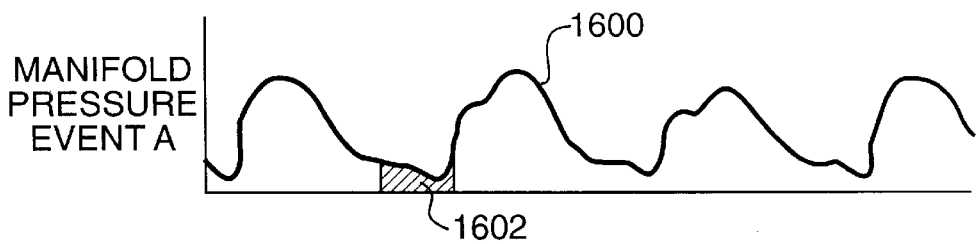
Figure 38:
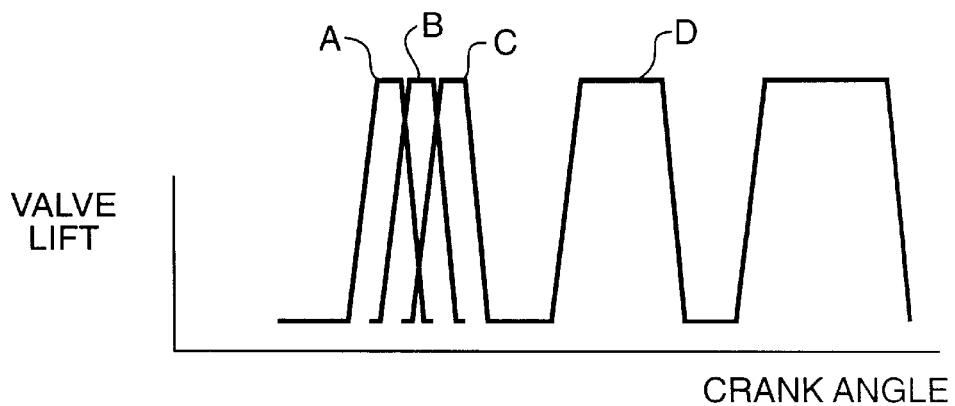

FIGS. 35–37 depict traces of the pressure profile 1600 in the exhaust manifold during combination braking, correlated with three examples of exhaust gas recirculation events a, b and c (at different times), and compression release braking event d, as shown in FIG. 38. The three exhaust gas recirculation events a, b and c represent three potential timings for a single exhaust gas recirculation event, as shown in FIGS. 35–37. If event b represents the standard timing, then event a represents advancement of valve actuation, and event c represents retardation of valve actuation. With reference to FIGS. 35–37, event A occurs during a lower manifold pressure event than event b. While event c occurs at a higher manifold pressure event than event b. In this example, the timing and magnitude of the exhaust gas recirculation event can be modified (advanced as for event a or retarded as for event c) to exploit the exhaust manifold pressure profile.

For example, if there is a need for higher retarding power, more gas could be recirculated by delaying and/or increasing the magnitude of the exhaust gas recirculation event, e.g. event c. This would allow the system to exploit the higher exhaust manifold pressures available at later crank angle degree times. This in turn would improve the operation of the compression release retarder, allowing the brake to develop higher retarding power, than it would otherwise. Similarly, if the engine operating conditions are running in excess of predetermined exhaust temperature levels, recirculating less exhaust gas by advancing to event a would help cool the engine to achieve optimal burning.

Alternatively, if there is a need for lower retarding power, less gas could be recirculated by advancing the beginning and end, and/or decreasing the magnitude of the exhaust gas recirculation event. This would allow the system to exploit the lower exhaust manifold pressures available at earlier crank angle degree times. This in turn would diminish the performance of the compression release retarder, allowing the brake to develop lower retarding power than it would otherwise.

The mass of gas recirculated into the cylinder for each event a, b, and c, is proportional to the area under the manifold pressure plot 1600 corresponding with the opening and closing of the valve for each of the events a, b, and c. It should be apparent from FIG. 38 that advancing valve actuation may result in event a, which corresponds with area 1602 in FIG. 37, and that retarding valve actuation may result in event c, which corresponds with area 1606 in FIG. 35. Since area 1606 is greater than area 1604, and area 1604 is greater than area 1602, it may be shown that advancing the time of valve actuation may reduce the gas mass recirculated, and retarding the time of valve actuation may increase the gas mass recirculated. As a result, an optimal mix of intake gas and recirculated gas may be achieved. The system 200 also allows variable duration of the exhaust gas recirculation event. The areas under curve 1600 can be reduced or expanded as a function of duration of opening of exhaust valve 30 controlled by trigger valve 800. With reference to FIGS. 5–8, the timing of an exhaust gas recirculation event may be varied in response to the operating mode of the engine, i e. in response to the engine being in positive power mode versus engine braking mode. During positive power, the exhaust gas recirculation event may be selectively advanced, even to the point of being carried out entirely within the timing of a main intake event. During engine braking, the exhaust gas recirculation event may be retarded to reduce the overlap between the exhaust gas recirculation and intake event. Reduction of this overlap results in an increase in the gas mass charge to the cylinder brought about by the exhaust gas recirculation.

It will be apparent to persons of ordinary skill in the art that various modifications and variations could be made in the control of the opening, closing, and magnitude of the exhaust gas recirculation valve opening event, without departing from the scope or spirit of the invention. The example described above with respect to FIGS. 35–38 relates to the specific profile shown. If the pressure peak, instead, preceded the exhaust gas recirculation event, the inverse relationship would be obtained. Similarly, if the profile were more irregular, comparable adjustments in opening, closing and magnitude could be made.

Other variations of the structure and function of elements of the present invention are discussed above. Additional modifications and variations will be apparent to those skilled in the art. Thus, it is intended that the present invention cover all the variations and modifications of the invention, provided they come within the scope of the appended claims and their equivalents.

Alternate Embodiments

Figure 22:
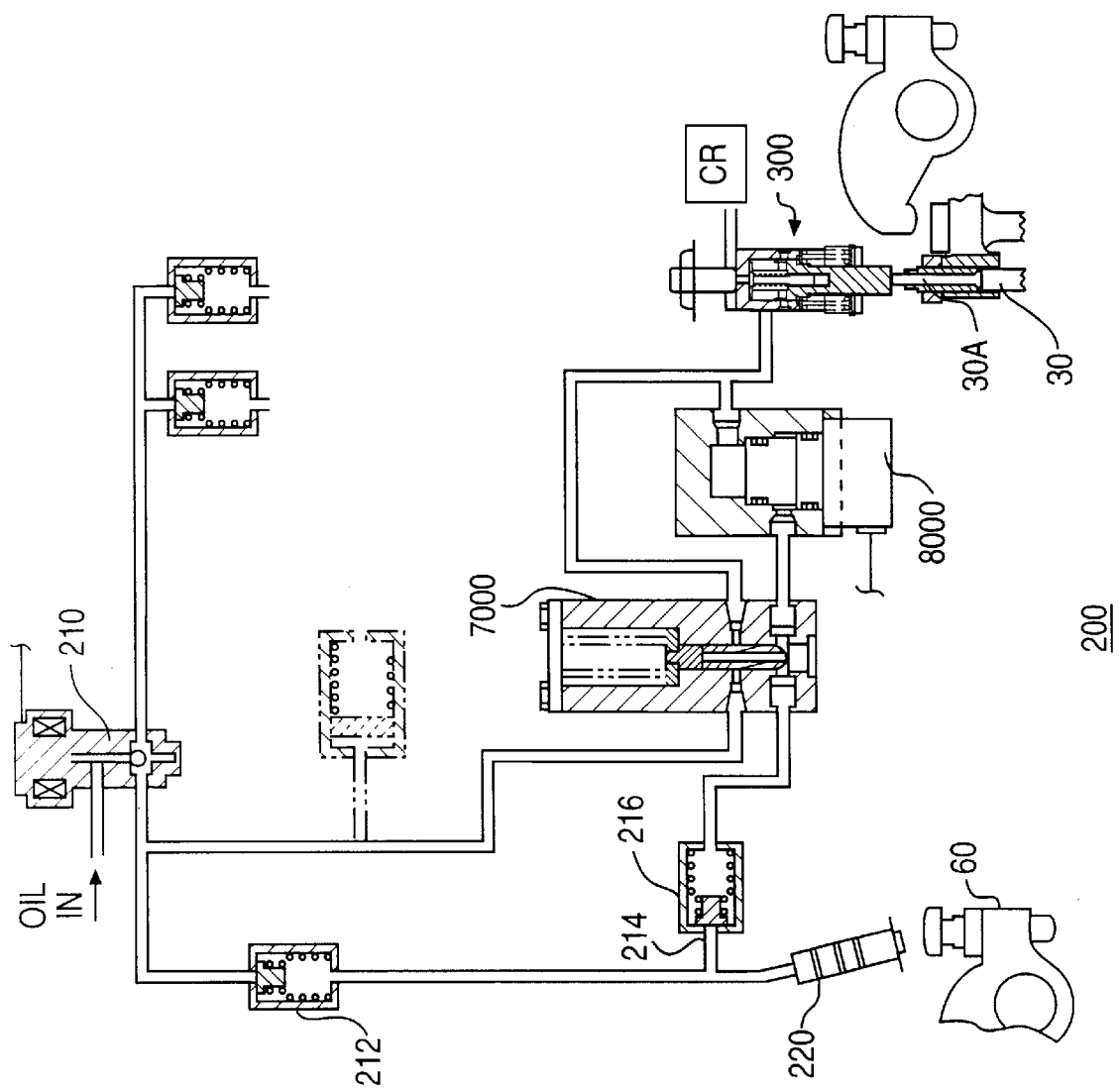
FIG. 22 is an alternative embodiment of the device of FIG. 9, employing a two-way trigger rather than the three-way trigger shown in FIG. 9.

Continuing with the embodiments shown in the accompanying figures, FIG. 22 is a schematic diagram depicting an alternate embodiment of the exhaust gas recirculation means 200. The exhaust gas recirculation means 200 employs a two-way trigger valve assembly 8000 and a modified energy storage means 7000.

Figure 23:
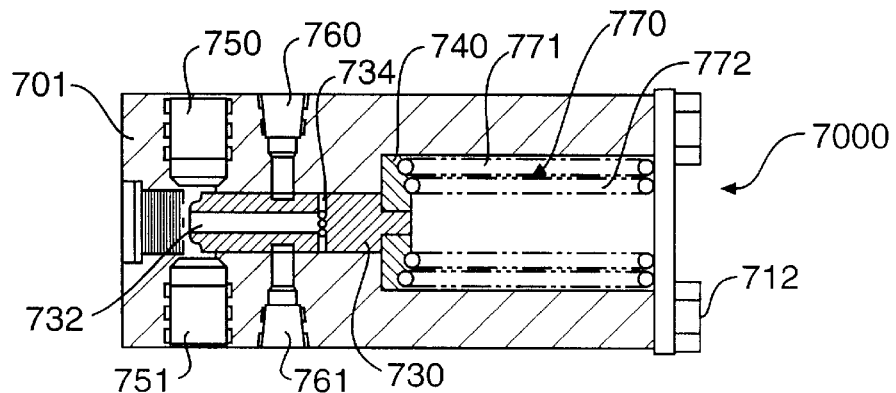
FIGS. 23–25 are cross-sectional diagrams of a delay piston according to an alternative embodiment of the present invention, in various modes of operation, for opening exhaust valves to achieve exhaust gas recirculation.
Figure 24:
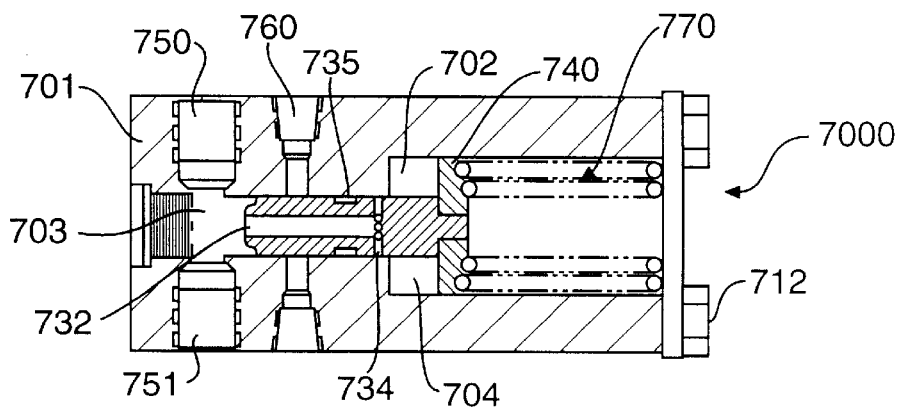
Figure 25:
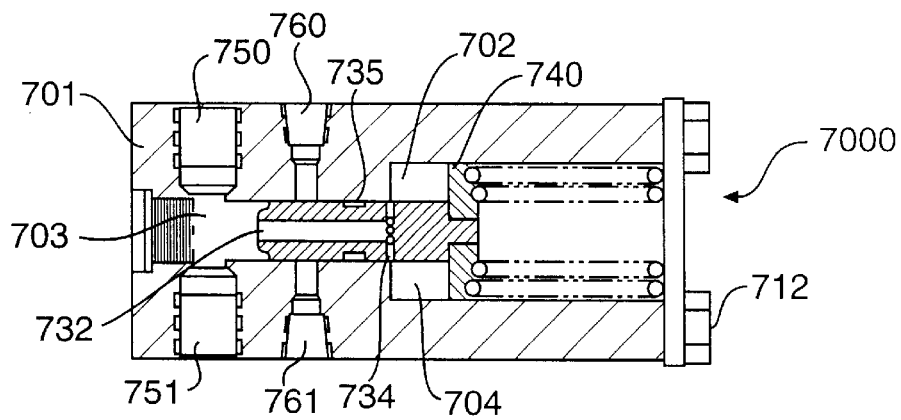

FIGS. 23–25 depict a cross-sectional view of an alternate embodiment of the energy storage means 7000 of the present invention. In an alternate embodiment of the present invention, energy storage means 7000 is a delay piston subassembly, comprising energy storing means 770, retainer means 712, and piston means 730. FIG. 23 depicts the delay piston subassembly 7000 in the "off" position. In that position, piston means 730 is engaged but not loaded by energy storing means 770 and has moved to the left in the cooperating cavity 703 formed in the body 701 of delay piston subassembly 7000.

In an alternate embodiment of the present invention, piston means 730 has an annular groove 735 formed in the perimeter thereof medial its two ends. Groove 735 allows hydraulic fluid to communicate from opening 760 in the body 701 on one side of the piston means, through the annular groove 735 formed in the body of the piston means 730 to hydraulic fluid conduit 761 on the opposite side of delay piston subassembly 7000.

As the piston means 730 is charged, hydraulic fluid is admitted to port 750 formed in delay piston subassembly body 701. The high pressured hydraulic fluid impinges against the end of piston means 730 forcing it to the right, as shown in FIG. 24. As the cavity 703 formed in delay piston subassembly 7000 fills with high pressure hydraulic fluid through port 750, hydraulic fluid also travels through bore 732 formed in the piston means 730. With the continuing addition of high pressure hydraulic fluid, piston means 730 pushes against restraining plate 740, compressing springs 771 and 772 of energy storing means 770. Compression of springs 771 and 772 continues until the master piston 220 stops supplying hydraulic fluid.

When the two-way trigger valve assembly 8000 opens to permit the flow of hydraulic fluid to the slave piston subassembly 300 to open exhaust valve 30, piston means 730 begins to move to the left to the position shown in FIG. 23. When the groove 735 starts communicating with apertures 760 and 761, hydraulic fluid then flows through apertures 760 and 761 causing the hydraulic fluid to flow in the direction towards solenoid valve 210, which allows the slave piston 300 to retract and causing the valve 30 to close.

As high pressure hydraulic fluid forces piston means 730 to the right, bore 732 admits high pressure hydraulic fluid to apertures 734. Apertures 734, however, are occluded by the wall of the delay piston subassembly body 701 in which piston means 730 travels. When piston means 730 has traveled a sufficient distance that apertures 734 clear shoulder 702 formed on the interior of delay piston subassembly body 701, apertures 734 bleed high pressure hydraulic fluid into cavity 704, protecting against excessive travel of piston means 730, as shown in FIG. 25.

Figure 26:
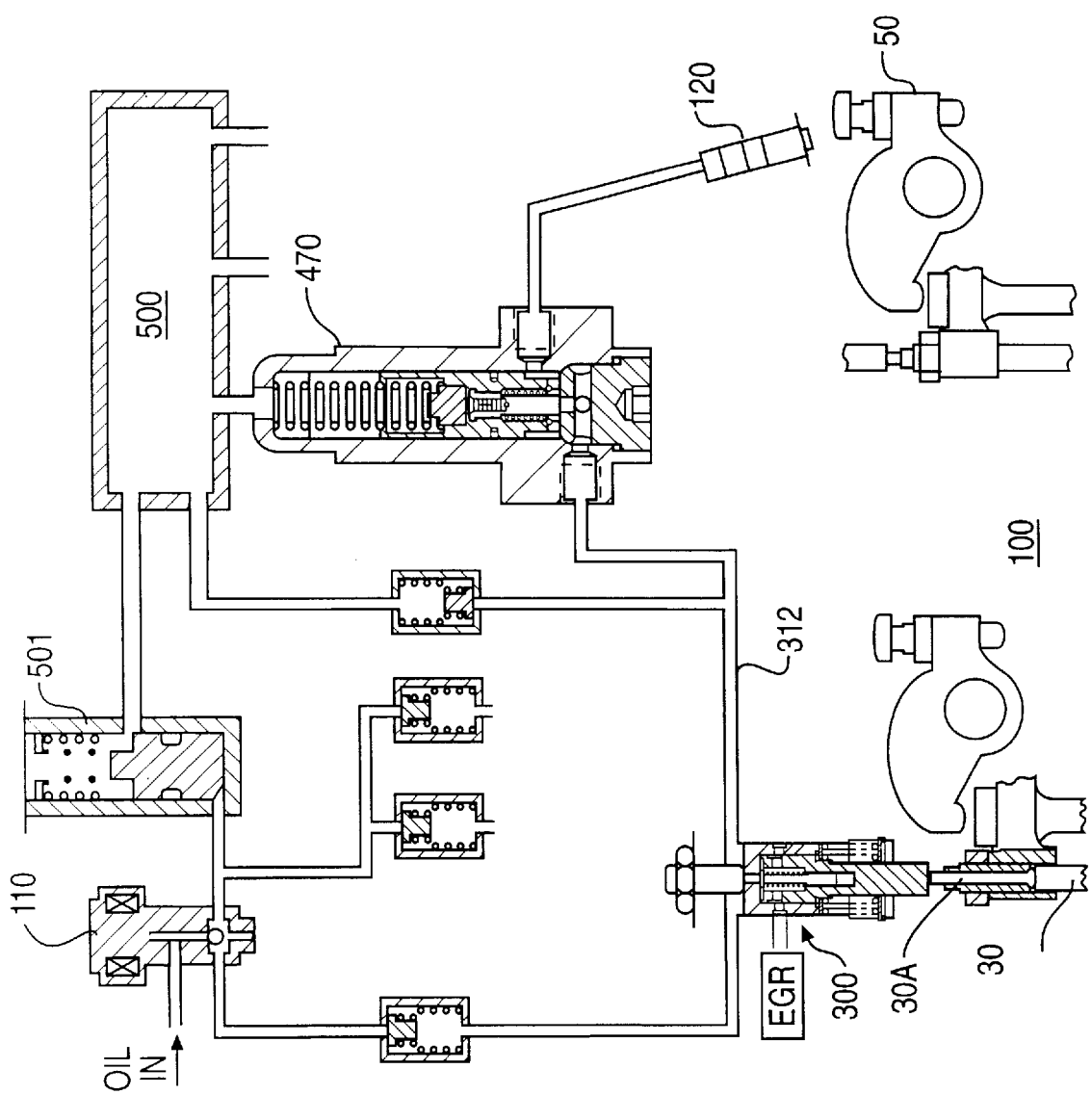
FIG. 26 is a schematic diagram of an alternative embodiment of the present invention, employing an alternative compression release system.
Figure 27:
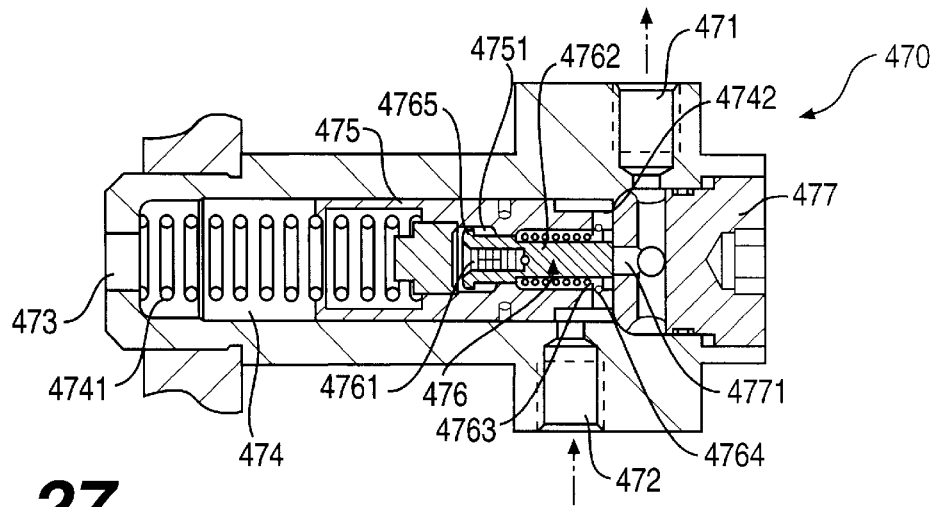
FIGS. 27–29 are schematic diagrams of a delay piston assembly with a trigger valve subassembly of an alternative embodiment of the present invention, employing an alternative compression release system, showing the trigger valve in the "off", trigger point, and full travel positions, respectively.
Figure 28:
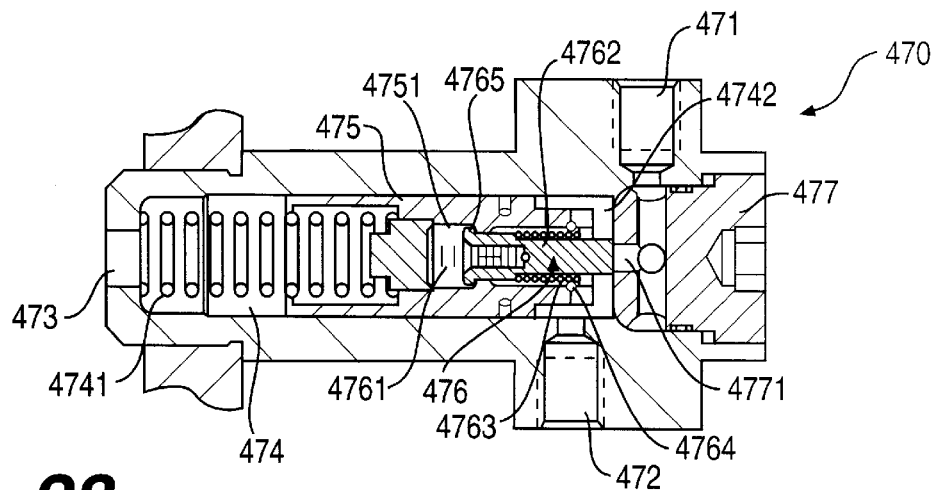
Figure 29:
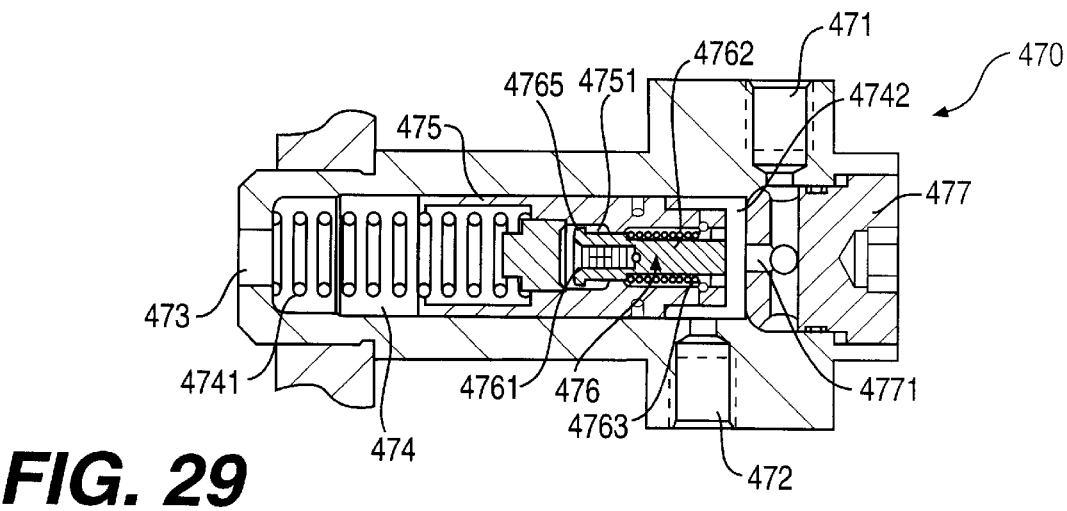

FIG. 26 depicts an alternate embodiment of the compression release retarding means 100 according to the present invention having a combined delay piston subassembly trigger pistons means assembly 470. FIGS. 27–29 depict the delay piston subassembly trigger valve assembly 470 in various modes of operation, including the off position, the trigger point position and full travel position, respectively. The delay piston subassembly trigger valve assembly 470 includes port 471 that fluidly connects the valve assembly 470 to slave piston subassembly 300. Port 472 fluidly connects the valve assembly 470 to the master piston 120. Port 473 fluidly connects the valve assembly to plenum 500. The valve assembly 470 includes a cavity 474 having a spring biased plunger 475. The plunger 475 contains a cavity 4751 located at one end having a valve 476 therein. The valve 476 includes a spring 4761, a piston 4762 and a spring biased assembly 4763 and retaining means 4764 surrounding the piston 4762. In the off position, as shown in FIG. 27, the piston 4762 covers aperture 4771 in cap 477 blocking communication between the slave piston subassembly 300 and master piston 120. In the off position, an end of piston 4762 abuts the end of cavity 4751 of plunger 475.

As hydraulic fluid pumped by energy deriving means 120 enters through port 472 to fill cavity 4742, the plunger 475 is moved to the left, as shown in FIG. 28. When the lower portion of cavity 4751 comes into contact with end portion 4765 of piston 4762, the piston 4762 begins to move away from aperture 4771. As pressure continues to increase within cavity 4742, the spring biased assembly 4763 biases the piston 4762 to the position shown in FIG. 29. Plunger 475 then forces hydraulic fluid to slave piston 300 to open valve 30. Plunger 475 then returns to the position shown in FIG. 27. At this point, hydraulic fluid is no longer pumped to the slave piston 300. The flow of hydraulic fluid then reverses, causing slave piston 300 to retract, allowing valve 30 to close. Hydraulic fluid flows from the slave piston 300 through port 471 to cavity 4742, where valve 476 functions as a check valve to prevent flow of hydraulic fluid back to the slave piston 300 until hydraulic fluid is again pumped by the energy deriving means 120.

Figure 30:
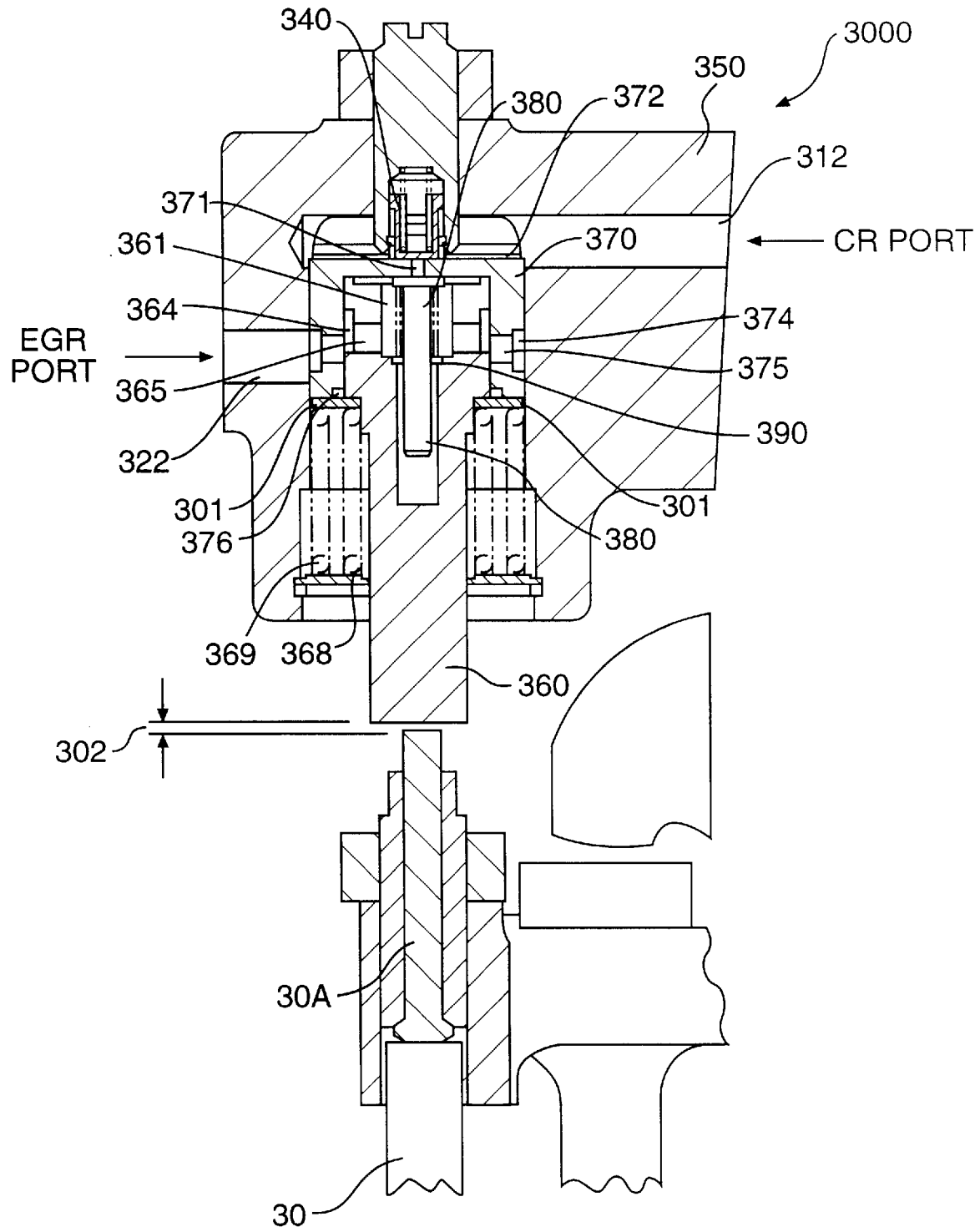
FIG. 30 is a cross-sectional view of an alternative embodiment of the slave piston subassembly of the present invention, depicting the slave piston in the "off" position.

FIGS. 30–34 depict an alternate embodiment of the slave piston subassembly 3000 of the present invention. The alternate embodiment of the slave piston subassembly 3000 of the present invention includes slave piston housing 350, inner slave piston 360, outer slave piston 370, internal relief valve 380, and internal relief valve spring 390. FIG. 30 depicts slave piston subassembly 3000 in the "off" position, that is when the slave piston subassembly 3000 is not actuated by either the exhaust gas recirculation means 200 through conduit 322 or the compression release retarding means 100 through conduit 312. In the "off" position, inner and outer slave pistons 360 and 370, respectively, are biased by at least one spring 368 and 369 upward into cavity 355 in slave piston housing 350. Low pressure hydraulic fluid is supplied through conduit 312 from the compression release retarding means 100. Internal relief valve spring 390 biases internal relief valve pin 380 against the under side of outer slave piston subassembly 370, covering the relief valve aperture 371 formed in the outer slave piston subassembly 370.

Figure 31:
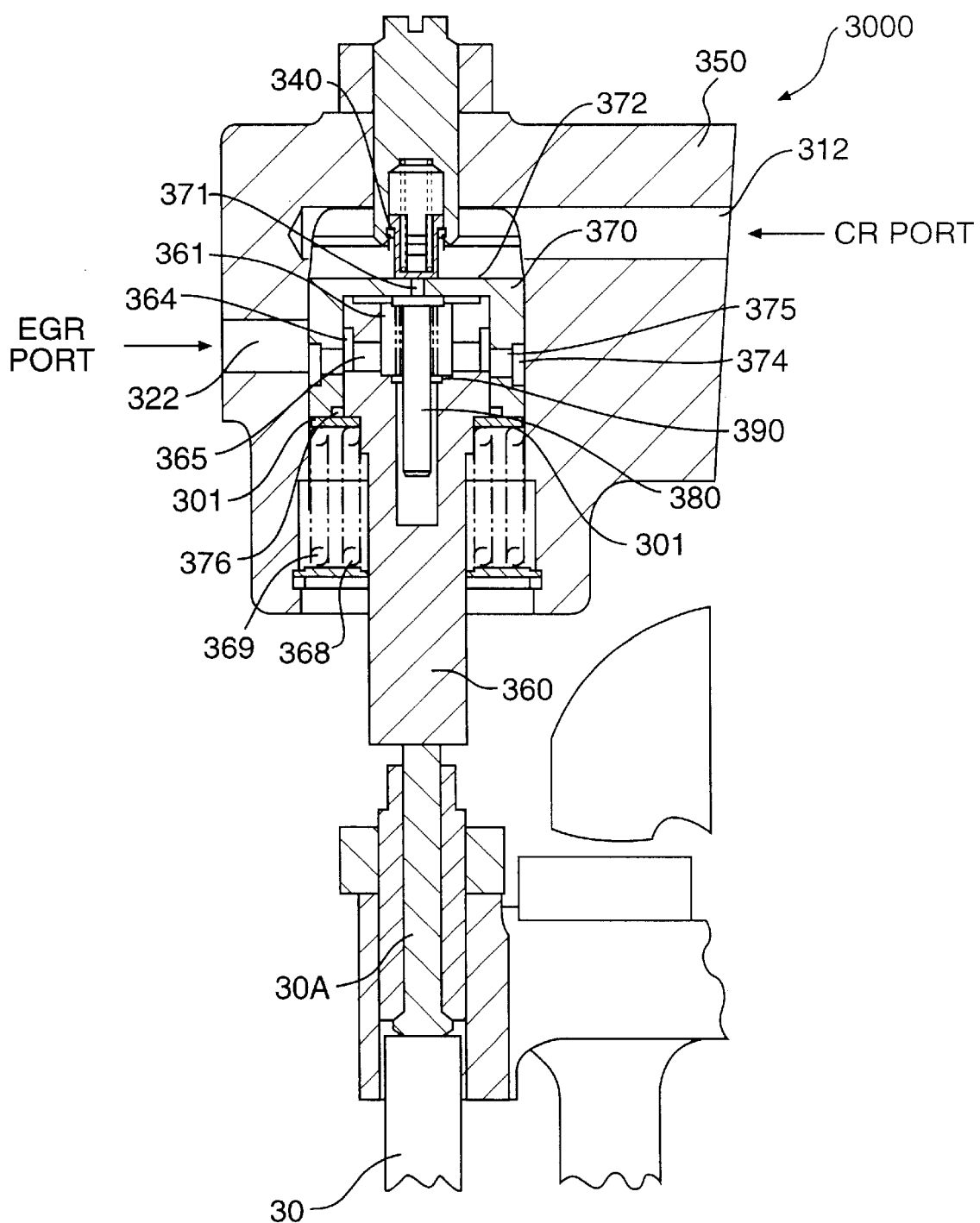
FIG. 31 is a cross-sectional view of an alternative embodiment of the slave piston subassembly of FIG. 9 depicting the slave piston compression release stroke.

At the beginning of a compression release retarding stroke, high pressure hydraulic fluid is supplied through conduit 312 to the top surface 372 of outer slave piston 370, as shown in FIG. 31. The high pressure hydraulic fluid forces outer slave piston 370 to move downward, abutting inner slave piston 360, and forcing the entire slave piston assembly 3000 in a downward direction through cavity 355. During the course of its downward travel, plunger 340 travels with outer slave piston subassembly 370, occluding relief valve aperture 371, as shown in FIG. 31.

Figure 32:
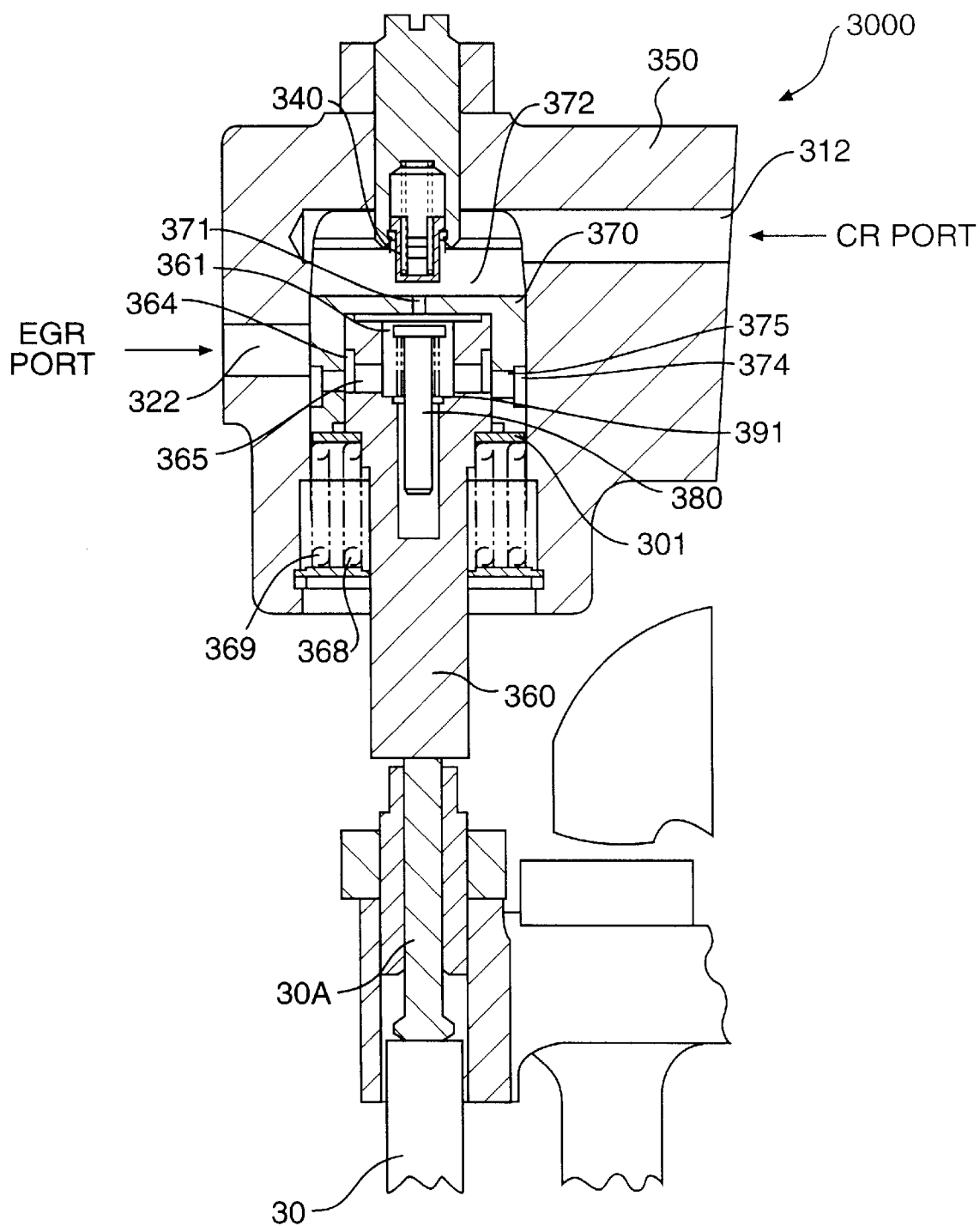
FIG. 32 is a cross-sectional view of an alternative embodiment of the slave piston subassembly of FIG. 9 depicting the slave piston compression release stroke, in overtravel mode.
Figure 33:
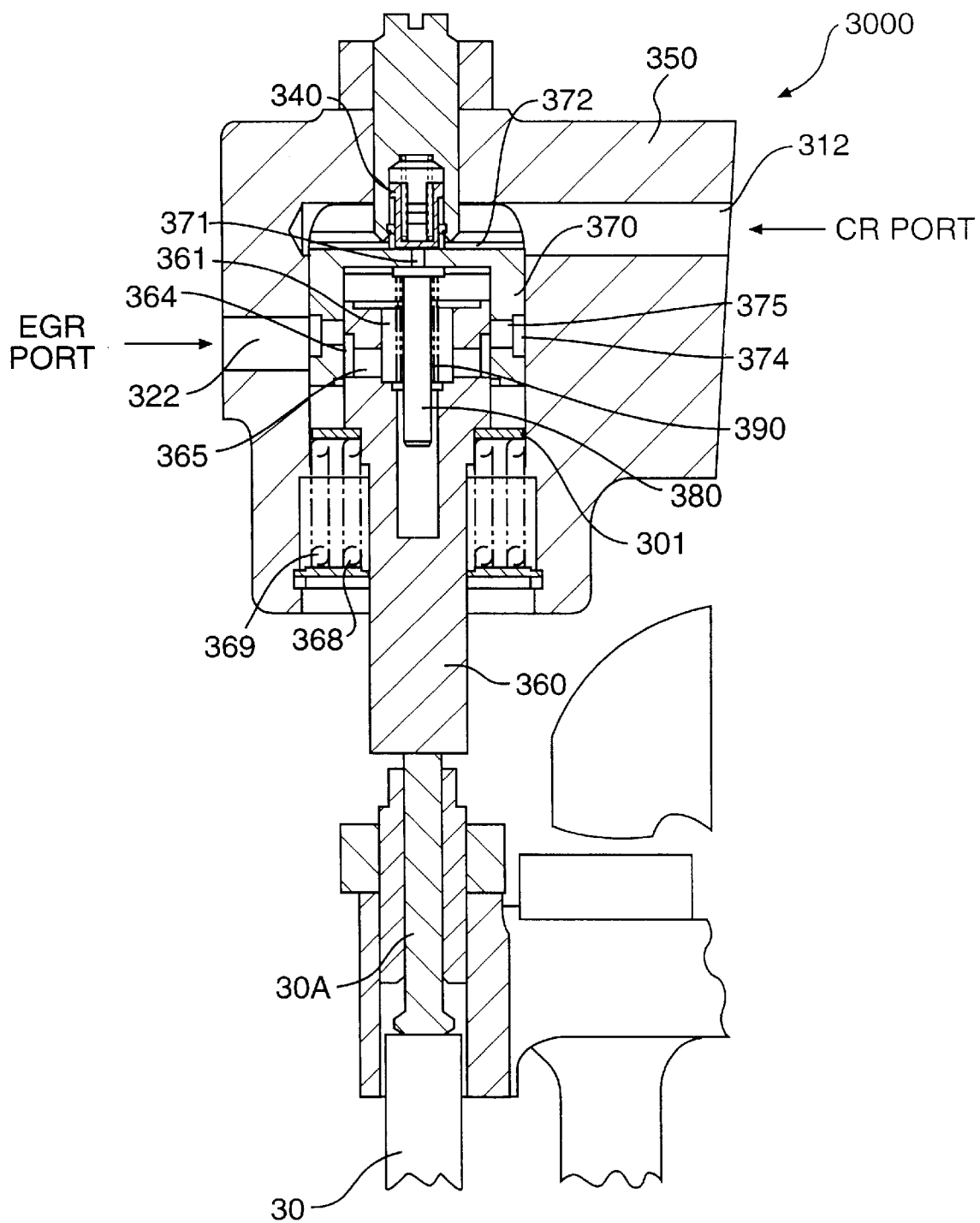
FIG. 33 is a cross-sectional view of an alternative embodiment of the slave piston subassembly of the present invention, depicting the exhaust gas recirculation stroke, for activating an exhaust valve to achieve exhaust gas recirculation.
Figure 34:
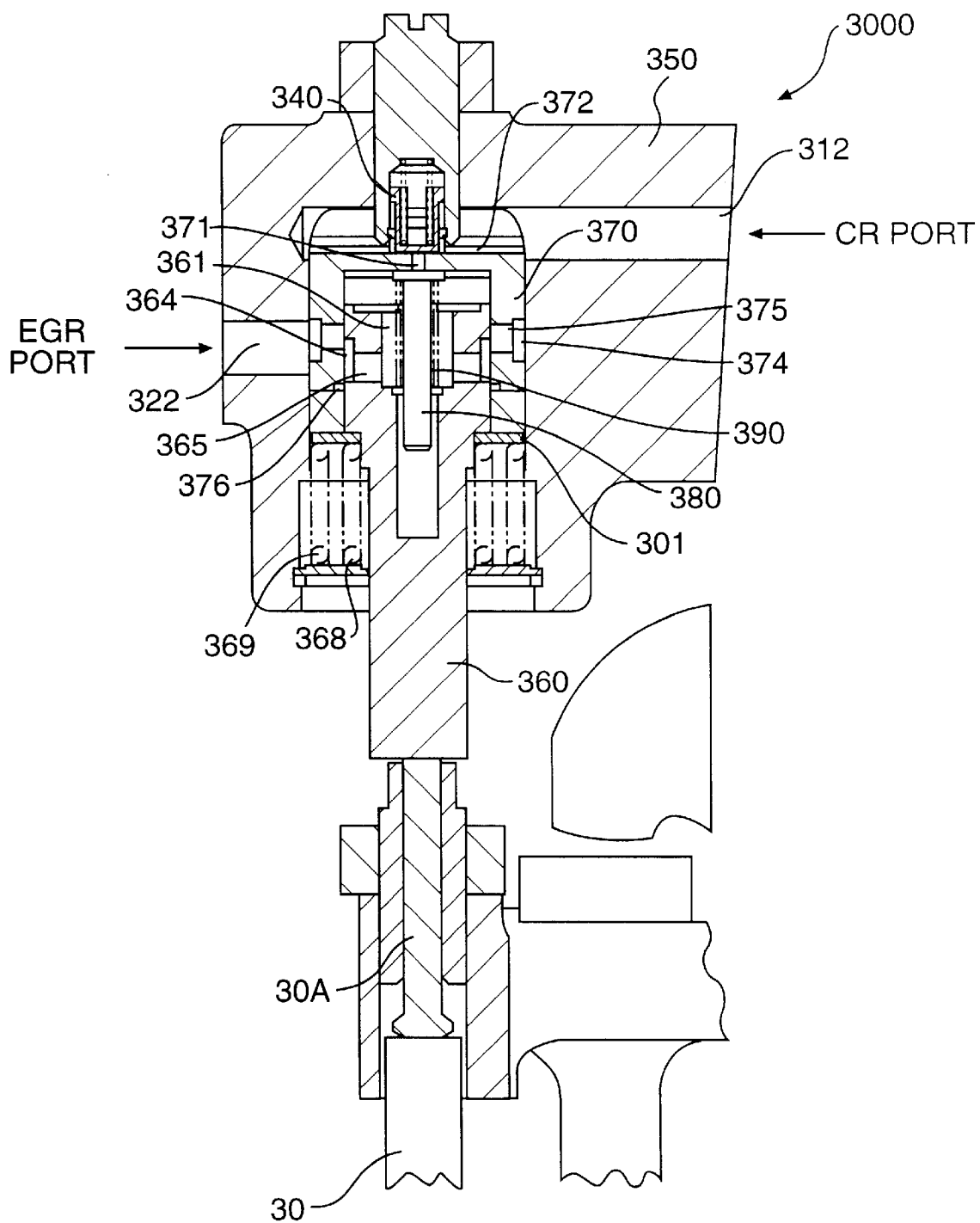
FIG. 34 is a cross-sectional view of an alternative embodiment of the slave piston subassembly of the present invention, depicting the exhaust gas recirculation stroke, in overtravel mode.

In an alternate embodiment of the present invention, slave piston subassembly 3000 also has means to prevent overtravel. Although plunger 340 travels downward with outer slave piston 370, plunger 340 has a limited stroke. Once outer slave piston 370 has traveled downward through cavity 355 a greater distance than the stroke of the plunger 340, plunger 340 uncovers relief valve aperture 371 formed in the top surface 372 of outer slave piston subassembly 370, as shown in FIG. 32. Uncovering relief valve aperture 371 allows high pressure hydraulic fluid to travel through relief valve aperture 371, overcoming internal relief valve spring 390 and pushing internal relief valve pin 380 away from the underside of outer slave piston 370. High pressure hydraulic fluid then travels through the interior bore 361 of inner slave piston 360 and through apertures 365 by draining the high pressure hydraulic fluid from cavity 355 through internal relief valve and apertures 365 and 375. The above-described overtravel means prevents the outer slave piston 370 from being driven downward an excessive distance.

In an alternate embodiment of the present invention, inner slave piston 360 also includes means to prevent overtravel under the influence of the exhaust gas recirculation means 200. As embodied herein, high pressure hydraulic fluid is supplied from the exhaust gas recirculation system 200 to conduit 322. Conduit 322 communicates with apertures 375 in outer slave piston 370, admitting high pressured, hydraulic fluid from the exhaust gas recirculation means 200 of the present invention to inner slave piston 360. During the exhaust gas recirculation stroke, outer slave piston 370 is disposed in the top portion of cavity 355. Only low pressured hydraulic fluid is supplied to cavity 355 through conduit 312, allowing outer slave piston 370 to stay in place in the upper portion of cavity 355. High pressure, hydraulic fluid is supplied from the exhaust gas recirculation means 200 of the present invention through conduit 322. As embodied herein, outer slave piston 370 has an annular groove 374 formed in the perimeter thereof communicating with aperture 375. High pressure, hydraulic fluid admitted by conduit 322 communicates with the annular groove 374 and apertures 375 to impinge inner slave piston 360.

As high pressure, hydraulic fluid is delivered to inner slave piston 360 through conduit 322, annular groove 374 and aperture 375, inner slave piston 360 moves downward within outer slave piston 370. As high pressure, hydraulic fluid is admitted to the interior of inner slave piston 360, the upper portion of inner slave piston 360 moves downward away from the under side of outer slave piston 370. As inner slave piston 360 slides downward within outer slave piston 370, internal relief valve spring 390 biases internal relief valve pin 380 against the under side of outer slave piston 370, occluding internal relief valve aperture 371.

As did outer slave piston 370, inner slave piston 360 also includes overtravel limiting means in an alternate embodiment of the present invention. The lower surface of outer slave piston 370 has a number of grooves 376 formed therein. Inner slave piston 360 also has a annular groove 364 formed in perimeter thereof, communicating with aperture 365. As inner slave piston 360 moves downward through outer slave piston 370, the annular groove 364 in inner slave piston 360 reaches the level of the bottom of the grooves 376 cut in the lower surface of outer slave piston 370, opening up a communication between the space between inner slave piston 360 and outer slave piston 370 and the area in the interior of slave piston subassembly 3000 in which the springs 368 and 369 are disposed. Once the lower shoulder of inner slave piston 360 has traveled downward a far enough distance to reach the upper base of the grooves 376 cut in the lower surface of outer slave piston 370, a communication is opened allowing high pressure, hydraulic fluid to drain from conduit 322 through the interior of inner slave piston 360 through apertures 365, thus, preventing overtravel of the inner slave piston 360.

It will be apparent to those skilled in the arts that various modifications and variations can be made in the construction and configuration of the present invention, without departing from the scope or spirit of the invention. Several variations have been discussed in the preceding text. Others will be apparent to persons of ordinary skill in the art. For example, some of the illustrative embodiments have been described with reference to an in-line six (6) cylinder engine. The number of cylinders (1, 4, 8, 10 or any other number of cylinders), the configuration (V, straight or other), aspiration (natural or turbocharged), cooling (air or water), or other basic engine parameters can all be varied.

The control of the compression stroke of an engine piston, such as for example, using a Miller cycle (as described in U.S. Pat. Nos. 4,424,790 and 5,549,095) is well known. It is contemplated that the present invention including all modifications and variations thereof are intended for use with a Miller cycle or Miller cycle engine.

Furthermore, the energy deriving means 120 and the means for controlling the application of stored energy 400 can be any of a number of structures or any combination of them: such as a slave piston subassembly used in conjunction with compression release retarders; intake valve train (rocker arms, push tubes, cams, hydraulic tappets, or other components); exhaust valve train (rocker arms, push tubes, cams, hydraulic tappets, or other components); dedicated cam; injector train (rocker arms, push tubes, cams, hydraulic tappets, or other components); external source; or any other appropriate components of the engine that provide a suitable source of energy. Although the inventors presently believe that it is preferable to use different structures for these two means 120 and 400, any appropriate means is considered to part of the invention provided it is capable of triggering at independent times. Thus, it is intended that the present invention cover all the variations and modifications of the invention, provided they come within the scope of the appended claims and their equivalents.

In addition, although the invention has been described with reference to a single valve, any number of valves can be opened in the cylinder consistent with the present invention. It is intended that the present invention cover the modifications and variations of the invention, provided they come within the scope of the appended claims and their equivalence.

What is claimed is:

1. In an internal combustion engine, having at least one cylinder and a valve associated with a cylinder of the engine, a system for providing exhaust gas recirculation to the cylinder independent of the motion of an engine component from which the energy for exhaust gas recirculation is derived, comprising:

means for deriving energy from the engine component;

storage means, in communication with said means for deriving energy, for storing the derived energy as potential energy;

energy transfer means, providing communication between said storage means and a valve actuation means, for selectively releasing the stored energy to said valve actuation means; and valve actuation means for opening the at least one valve in response to said energy released from said storage means to provide exhaust gas recirculation to the cylinder.

2. The system of claim 1, wherein said exhaust gas recirculation occurs while the fuel supply to the engine is interrupted to achieve exhaust gas recirculation.

3. The system of claim 1, wherein said exhaust gas recirculation occurs while the fuel supply to the engine is continuous.

4. The system of claim 2, further comprising means for providing compression release retarding, wherein said exhaust gas recirculation is carried out in combination with compression release retarding.

5. The system of claim 4 wherein the same means comprise said system and said compression release means.

6. The system of claim 2, further comprising means for providing exhaust braking, wherein said exhaust gas recirculation is carried out in combination with exhaust braking.

7. The system of claim 6, further comprising means for providing compression release retarding, wherein said exhaust gas recirculation and exhaust braking are carried out in combination with compression release retarding.

8. The system of claim 1, wherein said energy transfer means further comprises a control means for determining optimal valve actuation timing for one or more valve events selected from the group consisting of an exhaust gas recirculation event, and a compression release retarding event, wherein said one or more valve events are carried out responsive to a signal from said control means.

9. The system of claim 1, wherein said energy transfer means further comprises a control means for determining optimal valve lift for one or more valve events selected from the group consisting of an exhaust gas recirculation event, and a compression release retarding event, wherein said one or more valve events are carried out responsive to a signal from said control means.

10. The system of claim 1 wherein the engine component is associated with an intake valve of said cylinder.

11. The system of claim 1 wherein the engine component is associated with an exhaust valve of said cylinder.

12. The system of claim 1 wherein the engine component is a cam.

13. The system of claim 1 wherein the engine component is a rocker arm.

14. The system of claim 1, wherein said system provides variable timing exhaust gas recirculation.

15. The system of claim 14, wherein said energy transfer means include control means for controlling the release of stored energy to said valve actuation means for opening the at least one valve to provide the variable timing exhaust gas recirculation.

16. In an internal combustion engine, having at least one cylinder and a valve associated with a cylinder of the engine, a system for providing exhaust gas recirculation to the cylinder independent of the motion of an engine component, comprising:

compression release means for opening the at least one valve near a top of a cylinder compression stroke to carry out compression release retarding;

exhaust gas recirculation means for opening the at least one valve to recirculate exhaust gas to the cylinder; and valve actuation means cooperating with said compression release means and said exhaust gas recirculation means to open the at least one valve.

17. The system of claim 16, wherein the system provides enhanced fuel economy when the engine is in a positive power producing mode.

18. The system of claim 16, wherein the system improves the quality of emission control when the engine is in a positive power producing mode.

19. The system of claim 16, further comprising a second valve and second valve actuation means, wherein said compression release means actuates one of said valves and said exhaust gas recirculation means actuates the other of said valves.

20. The system of claim 16, wherein said compression release means is disabled when the engine is in a positive power producing mode.

21. The system of claim 16, wherein the exhaust gas recirculation and compression release retarding are carried out in combination with exhaust braking.

22. The system of claim 16, wherein said compression release means is disabled when the engine is in a braking mode, and said exhaust gas recirculation is carried out in combination with exhaust braking.

23. The system of claim 16, wherein said system provides variable timing exhaust gas recirculation.

24. In an internal combustion engine, a system for opening at least one valve of the engine to provide exhaust gas recirculation on both positive power and engine retarding, comprising:

master piston means, responsive to motion of an engine component;

energy storage means, responsive to motion of master piston means, for storing energy derived from the motion of said engine component;

trigger valve means, communicating with said energy storage means, for selectively releasing the stored energy independent of the motion of the engine component; and slave piston means, communicating with said trigger valve means, for opening the at least one valve in response to the stored energy released by said trigger valve means, wherein said trigger valve means releasing the stored energy to said slave piston means independent of the motion of the engine component.

25. The system of claim 24, wherein the opening of the at least one valve provides an exhaust gas recirculation event each engine cycle.

26. The system of claim 24, wherein the opening of the at least one valve provides a compression release retarding event each engine cycle.

27. The system of claim 24, wherein the opening of the at least one valve provides at least one of an exhaust gas recirculation event, and a compression release event each engine cycle.

28. The system of claim 24, wherein said system provides variable timing exhaust gas recirculation.

29. In an internal combustion engine, a system for opening at least one valve of the engine to selectively provide exhaust gas recirculation on both positive power and engine retarding, comprising:

compression release means for effecting engine retarding, further comprising first master piston means, responsive to motion of an engine component;

plenum means, communicating with said master piston means, for storing energy derived from the motion of said master piston;

first trigger valve means, communicating with said plenum, for selectively releasing said stored energy;

exhaust gas recirculation means, further comprising:
second master piston means, responsive to motion of an engine component;
delay piston means, communicating with said second master piston means, for storing energy derived from the motion of said second master piston means;
second trigger valve means, communicating with said delay piston for selectively releasing said stored energy from said delay piston means; and
slave piston means, communicating with said first and second trigger valves for opening the at least one valve in response to the release of stored energy;
wherein the at least one valve opens in response to said stored energy released by said first trigger valve resulting in an compression release retarding event, and the at least one valve opens in response to said stored energy released by said second trigger valve resulting in an exhaust gas recirculation event.

30. The system of claim 29, wherein said first and second trigger valves means are electronically controlled.

31. The system of claim 29, wherein said first trigger valve means comprises a multi-way trigger valve for selectively providing communication between any two of the group consisting of said plenum means and said slave piston means.

32. The system of claim 29 wherein said second trigger valve means comprises a multi-way trigger valve for selectively providing communications between any two of the group consisting of said second master piston means, said delay piston means and said slave piston means.

33. In an internal combustion engine, a system for utilizing energy derived from the engine to selectively open at least one cylinder valve, comprising:

means for deriving energy from the engine having an energy input from said engine and having an energy output;

an energy storage means for storing energy received from the means for deriving energy, said storage means having an energy input connected to the energy output of said means for deriving energy and having an energy output;

means for controlling the application of the energy stored in the storage means to a valve actuation means, said means for controlling having an energy input connected to the energy output of the storage means and having an energy output; and means for opening at least one cylinder valve using energy received from the means for controlling, said means for opening having an energy input connected to the means for controlling and having a connection with said at least one valve, wherein the at least one valve may be opened using energy derived from the engine and transferred through the system to the means for opening.

34. The system of claim 33, wherein said means for deriving energy comprises a hydraulic piston for converting the motion of an engine component into hydraulic pressure.

35. The system of claim 33, wherein said energy storage means comprises a plenum for storing hydraulic fluid under pressure.

36. The system of claim 35, wherein said means for controlling the application of energy comprises a electronically controlled hydraulic valve.

37. The system of claim 36 wherein said means for opening a cylinder valve comprises a hydraulically activated slave piston for converting hydraulic pressure into a rectilinear motion used to open said at least one valve.

38. The system of claim 33 wherein said energy is electrical energy.

39. The system of claim 33 wherein said energy is mechanical energy.

40. In a method of operating an internal combustion engine in a positive power mode and a braking mode, the improvement comprising providing exhaust gas recirculation through the steps of:

deriving energy from an engine component;

temporarily storing said energy; and selectively applying said energy to a means for opening at least one engine valve to carry out variable timing exhaust gas recirculation.

41. The method of claim 40 further comprising the provision of compression release retarding in combination with said exhaust gas recirculation through the steps of:

deriving energy from a second engine component;

temporarily storing said energy; and selectively applying said energy to a means for opening at least one engine valve to carry out compression release retarding.

42. The method of claim 41 further comprising the provision of exhaust braking in combination with said exhaust gas recirculation and said compression release retarding.

43. The method of claim 40 further comprising the provision of exhaust braking in combination with said exhaust gas recirculation.

44. In an internal combustion engine having a selectively actuated exhaust valve capable of providing variable timing exhaust gas recirculation and compression release braking in an engine cylinder, an exhaust valve actuator comprising:

a fluid tight chamber having a top wall and a side wall;

a bifurcated piston having upper and lower portions slidably disposed within said chamber along said side wall, wherein said upper and lower portions have mutually engageable shoulders for applying pressure to one another;

a first port in the chamber top wall for providing fluid in a first space between the chamber top wall and the piston upper portion;

a second port in the chamber side wall for providing fluid in a second space between the piston upper portion and the piston lower portion;

an extension member for transferring force between said piston lower portion and said exhaust valve located externally of said chamber; and spring means for biasing said piston in a direction compatible with said exhaust valve being closed;

wherein the provision of fluid in said first space moves the piston upper portion, lower portion, extension member downward and thereby opens said exhaust valve, and wherein the provision of fluid in said second space moves the piston lower portion and extension member downward and thereby opens said exhaust valve.

45. The exhaust valve actuator of claim 44 further comprising a passage in said piston upper portion for providing fluid between the second port and the second space.

46. The exhaust valve actuator of claim 44 wherein said piston lower portion is slidable within a hollow interior portion of said piston upper portion.

47. The exhaust valve actuator of claim 44 further comprising means for adjusting the upper most position in the chamber attainable by the piston.

48. The exhaust valve actuator of claim 44 wherein said first port is connected to a compression release hydraulic system and said second port is connected to an exhaust gas recirculation hydraulic system.

49. In an internal combustion engine, having at least one cylinder and a valve associated with a cylinder of the engine, a system for providing exhaust gas recirculation to the at least one cylinder, comprising:

means for deriving energy from the engine component;

storage means, in communication with said means for deriving energy, for storing said derived energy as potential energy;

energy transfer means including trigger valve means, providing communication between said storage means and a valve actuation means, for selectively releasing the stored energy to said valve actuation means; and valve actuation means for opening the at least one valve in response to said energy released from said storage means to provide exhaust gas recirculation to the cylinder.

50. The system of claim 49, wherein said exhaust gas recirculation occurs while the fuel supply to the engine is interrupted to achieve exhaust gas recirculation.

51. The system of claim 49, wherein said exhaust gas recirculation occurs while the fuel supply to the engine is interrupted to achieve exhaust gas recirculation.

52. The system of claim 50, further comprising means for providing compression release retarding, wherein said exhaust gas recirculation is carried out in combination with compression release retarding.

53. The system of claim 50, further comprising means for providing exhaust braking, wherein said exhaust gas recirculation is carried out in combination with exhaust braking.

54. The system of claim 53, further comprising means for providing compression release retarding, wherein said exhaust gas recirculation and exhaust braking are carried out in combination with compression release retarding.

55. The system of claim 50, wherein said energy transfer means further comprises a control means for determining optimal valve actuation timing for one or more of valve events selected from the group consisting of: an exhaust gas recirculation event, and a compression release retarding event; and wherein said one or more valve events are carried out responsive to a signal from said control means.

56. The system of claim 50, wherein said energy transfer means further comprises a control means for determining optimal valve lift for one or more of valve events selected from the group consisting of: an exhaust gas recirculation event, and a compression release retarding event; and wherein said one or more valve events are carried out responsive to a signal from said control means.

57. In an internal combustion engine, having at least one cylinder and a valve associated with a cylinder of the engine, a system for providing exhaust gas recirculation to the at least one cylinder, comprising:

compression release means for opening the at least one valve near a top of a cylinder compression stroke to carry out compression release retarding;

exhaust gas recirculation means for opening the at least one valve to recirculate exhaust gas to the cylinder; and valve actuation means cooperating with said compression release means and said exhaust gas recirculation means to open the at least one valve.

58. The system of claim 57, further comprising a second valve and second valve actuation means, wherein said compression release means actuates one of said valves and said exhaust gas recirculation means actuates the other of said valves.

59. The system of claim 57, wherein said compression release means is disabled when the engine is in a positive power producing mode.

60. The system of claim 57, wherein the exhaust gas recirculation and compression release retarding are carried out in combination with exhaust braking.

61. The system of claim 57, wherein said compression release means is disabled when the engine is in a braking mode, and said exhaust gas recirculation is carried out in combination with exhaust braking.

62. In an internal combustion engine, a system for opening at least one valve of the engine to provide exhaust gas recirculation on both positive power and engine retarding, comprising:

master piston means, responsive to motion of an engine component;

energy storage means, responsive to motion of master piston means, for storing energy derived from the motion of said engine component;

trigger valve means, communicating with said energy storage means, for selectively releasing said stored energy; and slave piston means, communicating with said valve actuation means, for opening the at least one valve in response to said stored energy released by said trigger valve means, wherein said trigger valve means releasing said stored energy to said slave piston means.

63. The system of claim 62, wherein the opening of the at least one valve provides an exhaust gas recirculation event each engine cycle.

64. The system of claim 62, wherein the opening of the at least one valve provides a compression release retarding event each engine cycle.

65. The system of claim 62, wherein the opening of the at least one valve provides an exhaust gas or exhaust gas recirculation event, and a compression release event each engine cycle.

66. In an internal combustion engine, having at least one cylinder and a valve associated with a cylinder of the engine, a system for providing exhaust gas recirculation to the cylinder independent of the motion of an engine component from which the energy for exhaust gas recirculation is derived, comprising:

means for deriving energy from the engine component;

energy transfer means, providing communication between said means for deriving energy and a valve actuation means, for selectively transferring the energy from said means for deriving energy to said valve actuation means; and valve actuation means for opening the at least one valve in response to said energy transfer means to provide exhaust gas recirculation to the cylinder.

67. The system of claim 66, wherein said exhaust gas recirculation occurs while the fuel supply to the engine is interrupted to achieve exhaust gas recirculation.

68. The system of claim 67, further comprising means for providing compression release retarding, wherein said exhaust gas recirculation is carried out in combination with compression release retarding.

69. The system of claim 67, further comprising means for providing exhaust braking, wherein said exhaust gas recirculation is carried out in combination with exhaust braking.

70. The system of claim 69, further comprising means for providing compression release retarding, wherein said exhaust gas recirculation and exhaust braking are carried out in combination with compression release retarding.

71. The system of claim 66, wherein said energy transfer means further comprises a control means for determining optimal valve actuation timing for one or more of valve events selected from the group consisting of: an exhaust gas recirculation event, an exhaust gas recirculation event, and a compression release retarding event; and wherein said one or more valve events are carried out responsive to a signal from said control means.

72. The system of claim 66, wherein said energy transfer means further comprises a control means for determining optimal valve lift for one or more of valve events selected from the group consisting of: an exhaust gas recirculation event, an exhaust gas recirculation event, and a compression release retarding event; and wherein said one or more valve events are carried out responsive to a signal from said control means.

73. In an internal combustion engine, having at least one cylinder and a valve associated with a cylinder of the engine, a system for providing exhaust gas recirculation to the cylinder responsive to the motion of an engine component, comprising:

means for deriving energy from the engine component;

valve actuation means for opening the at least one valve in response to said means for deriving energy to provide exhaust gas recirculation to the cylinder; and energy transfer means, providing communication between said means for deriving energy and said valve actuation means, for selectively transferring the energy from said means for deriving energy to said valve actuation means.

74. In an internal combustion engine, a system for opening at least one valve of the engine to selectively provide variable timing exhaust gas recirculation on both positive power and engine retarding, comprising:

compression release means for effecting engine retarding, further comprising first master piston means, responsive to motion of an engine component;

trigger valve means, communicating with said first master piston means, for selectively releasing energy from said first master piston means;

exhaust gas recirculation means, further comprising:
second master piston means, responsive to motion of an engine component; and
slave piston means, communicating with said trigger valve means and said second master piston means, for opening the at least one valve;
wherein the at least one valve opens in response to energy released by said trigger valve means resulting in an compression release retarding event, and the at least one valve opens in response to energy released by said second master piston means resulting in an exhaust gas recirculation event.

75. The system of claim 74, wherein said trigger valve means is electronically controlled.

76. In an internal combustion engine, a system for utilizing energy derived from the engine to selectively open at least one cylinder valve, comprising:

means for deriving energy from the engine having an energy input from said engine and having an energy output;

means for controlling the application of the energy to a valve actuation means, said means for controlling having an energy input and an energy output; and means for opening at least one cylinder valve using energy received through the means for controlling, said means for opening having an energy input connected to the means for controlling and having a connection with said at least one valve, wherein the at least one valve may be opened using energy derived from the engine and transferred through the system to the means for opening.

77. The system of claim 73, wherein said means for opening a cylinder valve comprises a hydraulically activated slave piston for converting hydraulic pressure into a rectilinear motion used to open said at least one valve.

78. In a method of operating an internal combustion engine in a positive power mode and a braking mode, the improvement comprising providing exhaust gas recirculation through the steps of:

deriving energy from an engine component; and
selectively applying said energy to a means for opening at least one engine valve to carry out exhaust gas recirculation.

79. The method of claim 78, further comprising the provision of compression release retarding in combination with said exhaust gas recirculation through the steps of:

deriving energy from a second engine component; and
selectively applying said energy to a means for opening at least one engine valve to carry out compression release retarding.

80. The method of claim 79, further comprising the provision of exhaust braking in combination with said exhaust gas recirculation and said compression release retarding.

81. The method of claim 80, further comprising the provision of exhaust braking in combination with said exhaust gas recirculation.

82. A valve actuator comprising:

a fluid tight chamber having a top wall and a side wall;

a two piece piston having upper and lower portions slidably disposed within said chamber, wherein said upper and lower portions have mutually engageable shoulders for applying pressure to one another;

a first port in said chamber top wall adapted for providing fluid in a first space between said chamber top wall and said piston upper portion;

a second port in said chamber side wall adapted for providing fluid in a second space between said piston upper portion and said piston lower portion; and spring means for biasing said two piece piston in a direction corresponding to a closed position for a valve located externally of said chamber, wherein the provision of fluid in said first space moves said piston upper portion and said piston lower portion to open the valve, and the provision of fluid in said second space moves said piston lower portion to open the valve.

83. The valve actuator according to claim 82, further comprising:

an extension member for transferring force between said piston lower portion and the valve, wherein the provision of fluid in said first space moves said piston upper portion, said lower portion and said extension member to open the valve, and the provision of fluid in said second space moves said piston lower portion and said extension member to open the valve.

84. The exhaust valve actuator of claim 82 further comprising a passage in said piston upper portion for providing a fluid connection between said second port and said second space.

85. The exhaust valve actuator of claim 82 wherein said piston lower portion is slidable within a hollow interior portion of said piston upper portion.

86. The exhaust valve actuator of claim 82 further comprising means for adjusting the upper most position in the chamber attainable by said two piece piston.

* * * * *